US012704095B2

(12) United States Patent
Hardikar

(10) Patent No.: US 12,704,095 B2
(45) Date of Patent: Aug. 11, 2026

(54) GAS TURBINE ENGINE DEFINING A ROTOR CAVITY

(71) Applicant: General Electric Company, Evendale, OH (US)

(72) Inventor: Narendra Anand Hardikar, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/286,346

(22) Filed: Jul. 31, 2025

(65) Prior Publication Data

US 2025/0354521 A1 Nov. 20, 2025

Related U.S. Application Data

(62) Division of application No. 18/362,341, filed on Jul. 31, 2023, now Pat. No. 12,571,351.

(30) Foreign Application Priority Data

Jun. 14, 2023 (IN) ............................ 202311040571

(51) Int. Cl.

| | |
|---|---|
| ***F02C 7/28*** | (2006.01) |
| ***F01D 11/00*** | (2006.01) |
| ***F01D 11/02*** | (2006.01) |
| ***F04D 29/08*** | (2006.01) |
| ***F04D 29/22*** | (2006.01) |
| ***F04D 29/66*** | (2006.01) |
| *F01D 25/04* | (2006.01) |
| *F16J 15/54* | (2006.01) |

(52) U.S. Cl.

CPC .............. *F02C 7/28* (2013.01); *F01D 11/001* (2013.01); *F01D 11/02* (2013.01); *F04D 29/08* (2013.01); *F04D 29/2266* (2013.01); *F04D 29/668* (2013.01); *F01D 25/04* (2013.01); *F05D 2240/55* (2013.01); *F05D 2260/96* (2013.01); *F16J 15/54* (2013.01)

(58) Field of Classification Search

None

See application file for complete search history.

(56) References Cited

U.S. PATENT DOCUMENTS 4,361,213 A 11/1982 Landis et al.
4,397,471 A * 8/1983 Feldman .............. F01D 11/025 277/412

(Continued)

*Primary Examiner* — Lorne E Meade
*Assistant Examiner* — Alyson Joan Harrington
(74) *Attorney, Agent, or Firm* — Dority & Manning, P.A.

(57) ABSTRACT

A gas turbine engine includes a compressor section, a combustion section, and a turbine section arranged in serial flow order and defining a working gas flowpath, a compressor of the compressor section comprising an aft-most compressor stage; a stage of stator vanes located downstream of the aft-most compressor stage; a stator case including a seal pad; and a spool drivingly coupled to the compressor, the spool and the stator case together defining a rotor cavity in fluid communication with the working gas flowpath, the spool comprising a seal tooth assembly, the seal tooth assembly including a seal support extension, a seal tooth extending from the seal support extension toward the seal pad, and a dampener operable with the seal support extension.

10 Claims, 12 Drawing Sheets

(56) References Cited

U.S. PATENT DOCUMENTS

| | | | | |
|---|---|---|---|---|
| 5,333,993 | A * | 8/1994 | Stueber | F01D 11/001 415/178 |
| 6,884,028 | B2 | 4/2005 | Brauer et al. | |
| 7,500,824 | B2 | 3/2009 | Cheng et al. | |
| 7,540,709 | B1 | 6/2009 | Ebert | |
| 8,082,726 | B2 | 12/2011 | Cloft | |
| 8,540,486 | B2 | 9/2013 | Johnson | |
| 8,926,283 | B2 | 1/2015 | Lee et al. | |
| 8,979,481 | B2 | 3/2015 | Ingram | |
| 9,017,014 | B2 | 4/2015 | Lee et al. | |
| 9,097,128 | B2 | 8/2015 | Pierswall et al. | |
| 10,443,422 | B2 | 10/2019 | Ratzlaff et al. | |
| 10,526,906 | B2 | 1/2020 | Nguyen et al. | |
| 10,876,549 | B2 | 12/2020 | Duong et al. | |
| 11,248,471 | B2 | 2/2022 | Snider | |
| 2022/0298922 | A1 | 9/2022 | Wolfer et al. | |
| 2024/0255055 | A1 * | 8/2024 | Winder | F01D 25/183 |

* cited by examiner

| EMBODIMENT | Tf (RANKINE) | T3 (RANKINE) | Tf/T3 | INDUCER/HOLE ANGLE | A-HOLE/A-FP |
|---|---|---|---|---|---|
| 1 | 1450 | 1780 | 0.82 | 0 | 0.25 |
| 2 | 1450 | 1780 | 0.82 | 30 | 0.25 |
| 3 | 1450 | 1780 | 0.82 | 60 | 0.25 |
| 4 | 1450 | 1780 | 0.82 | 85 | 0.25 |
| 5 | 1520 | 1780 | 0.85 | 0 | 0.2 |
| 6 | 1520 | 1780 | 0.85 | 45 | 0.2 |
| 7 | 1520 | 1780 | 0.85 | 85 | 0.2 |
| 8 | 1590 | 1780 | 0.89 | 0 | 0.15 |
| 9 | 1590 | 1780 | 0.89 | 30 | 0.15 |
| 10 | 1590 | 1780 | 0.89 | 60 | 0.15 |
| 11 | 1590 | 1780 | 0.89 | 85 | 0.15 |
| 12 | 1650 | 1780 | 0.93 | 30 | 0.1 |
| 13 | 1700 | 1780 | 0.96 | 13 | 0.1 |
| 14 | 1700 | 1780 | 0.96 | 50 | 0.1 |
| 15 | 1700 | 1780 | 0.96 | 85 | 0.1 |
| 16 | 1780 | 1780 | 1.00 | 25 | 0.1 |
| 17 | 1780 | 1780 | 1.00 | 55 | 0.1 |
| 18 | 1780 | 1780 | 1.00 | 85 | 0.1 |
| 19 | 1830 | 1780 | 1.03 | 45 | 0.1 |
| 20 | 1880 | 1780 | 1.06 | 35 | 0.1 |
| 21 | 1880 | 1780 | 1.06 | 60 | 0.1 |
| 22 | 1880 | 1780 | 1.06 | 85 | 0.1 |
| 23 | 2000 | 1780 | 1.12 | 49 | 0.05 |
| 24 | 2000 | 1780 | 1.12 | 70 | 0.05 |
| 25 | 2000 | 1780 | 1.12 | 85 | 0.05 |

FIG. 5

GAS TURBINE ENGINE DEFINING A ROTOR CAVITY

PRIORITY INFORMATION

The present application claims priority to Indian Patent Application Number 202311040571 filed on Jun. 14, 2023 and is a divisional application of U.S. patent application Ser. No. 18/362,341 filed Jul. 31, 2023, which are incorporated herein by reference.

FIELD

The present disclosure relates to a gas turbine engine having a rotor cavity, such as a gas turbine engine having a rotor cavity and a compressor discharge pressure seal to seal off the rotor cavity.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. The turbomachine comprises a compressor section and a combustion section. The compressor section includes a high pressure compressor driven by a high pressure spool. The turbomachine further includes a stage of discharge nozzles at a location downstream of the high pressure compressor to guide an airflow into the combustion section of the turbomachine. A supporting structure of the discharge nozzles may define a rotor cavity with the high pressure spool. The turbomachine may include a compressor discharge pressure seal may be between the supporting structure of the discharge nozzles and the high pressure spool at a location to seal off the rotor cavity.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5 provides a table including numerical values corresponding to several gas turbine engines falling within the ranges depicted in FIG. 6.

DETAILED DESCRIPTION

Figure 1:
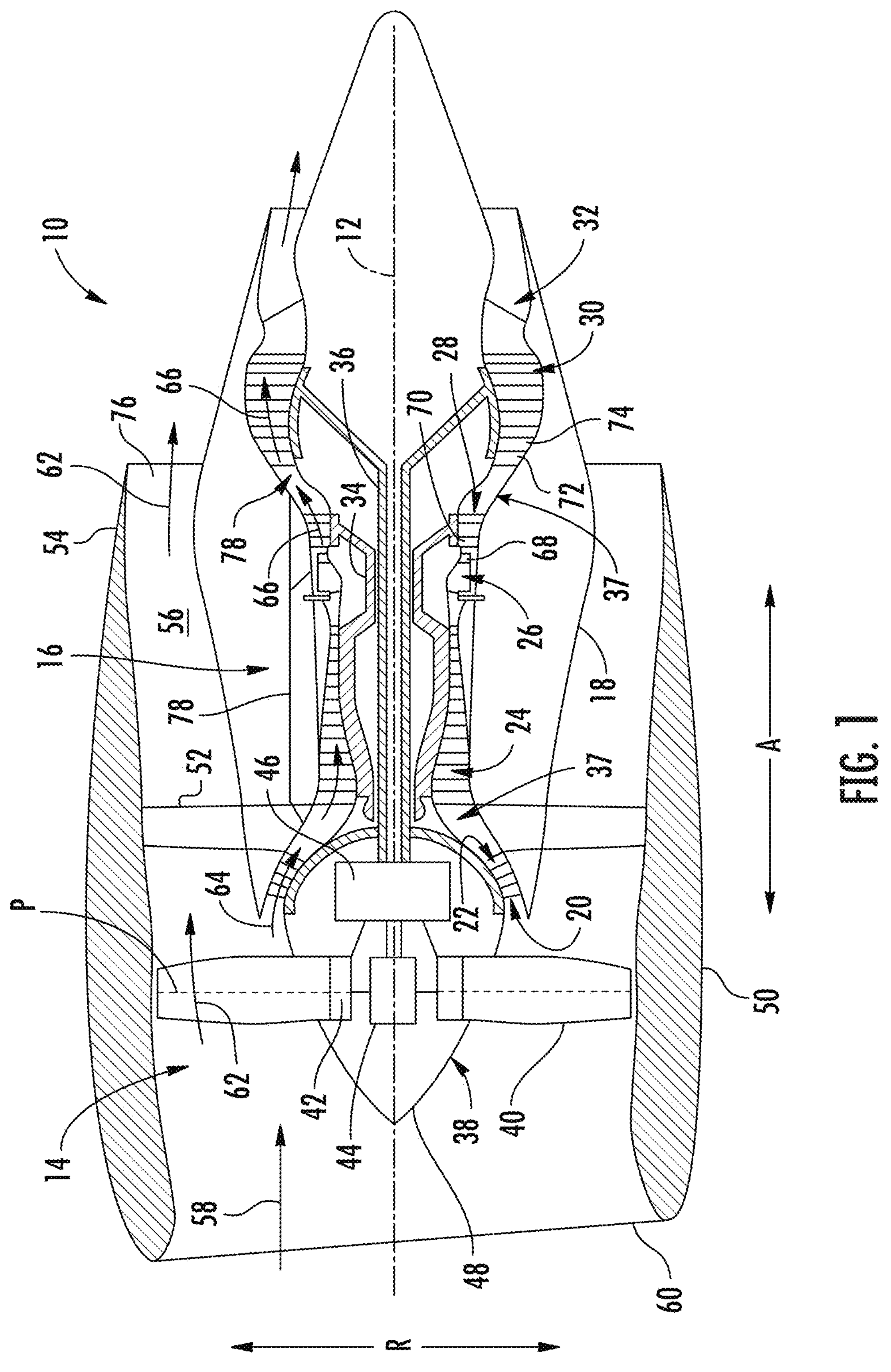
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, a gas turbine engine includes a turbomachine, which in turn includes a compressor section, a combustion section, a turbine section, and an exhaust section and defines a working gas flowpath therethrough. The compressor section more specifically includes a high pressure compressor, and the turbomachine includes a stage of discharge nozzles at a location downstream of the high pressure compressor, fluidly connecting the high pressure compressor to the combustion section. A high pressure spool is rotatably coupled to the high pressure compressor, and a stator case is coupled to the stage of discharge nozzles inward of the stage of discharge nozzles along a radial direction of the gas turbine engine. The stator case and the high pressure spool together define a rotor cavity fluidly coupled to the working gas flowpath. The stator case and the high pressure spool together also together form a compressor discharge pressure seal at one end of the rotor cavity. The high pressure spool includes a cantilevered member as part of the compressor discharge pressure seal.

The inventors of the present disclosure have found that, during certain operating conditions of the gas turbine engine, the cantilevered member may be susceptible to undesirable oscillations as a result of a mechanical resonance frequency of the cantilevered member and an acoustic resonance frequency of the cantilevered member overlapping or defining a relatively small margin. The cantilevered member may be oscillated at its mechanical resonance frequency as a result of its connection to a rotating component of the engine. The cantilevered member may be oscillated at its acoustic frequency as a result of its exposure to the working gas flowpath through the rotor cavity. In particular, the airflow through the working gas flowpath immediately downstream of a stage of rotor blades of the high pressure compressor generally flows in a pulsing manner as a result of the passing high pressure compressor rotor blades during the operating condition of the gas turbine engine. The pulsing of this airflow may oscillate the cantilevered member at its acoustic resonance frequency. When these mechanical and acoustic resonance frequencies overlap or define a relatively small margin, the cantilevered member may prematurely wear or fail due to severe oscillations.

Accordingly, the inventors of the present disclosure sought out a means to increase a margin between the acoustic and mechanical resonance frequencies of the cantilevered member during various operating conditions of the gas turbine engine. In the process of designing such an engine, the inventors discovered, unexpectedly, that by modifying a manner in which a supplemental airflow (e.g., an airflow other than an airflow directly from the working gas flowpath) is provided to the rotor cavity, the airflow may affect the acoustic resonance frequency of the cantilevered member, increasing a margin between the acoustic and mechanical resonance frequencies of the cantilevered member. More specifically, the inventors discovered during the course of designing several gas turbine engines which provide airflow to the rotor cavity in a variety of different manners, that a relationship exists among a temperature of the airflow provided to the rotor cavity (relative to a compressor exit temperature) and a circumferential angle, or swirl angle, at which the airflow is provided to the rotor cavity, such that inclusion of a system for providing airflow to the rotor cavity in accordance with an aspect of the present disclosure may result in a net benefit to the overall gas turbine engine design, and in particular may increase the margin between the acoustic and mechanical resonance frequencies of the cantilevered member.

With a goal of arriving at an improved gas turbine engine capable of increasing a margin between the acoustic and mechanical resonance frequencies that may act on the cantilevered member, the inventors proceeded in the manner of designing gas turbine engines having systems for providing airflow to the rotor cavity at different temperatures and at different swirl angles; checking an operability and resonance frequency characteristics of the designed gas turbine engines; redesigning the gas turbine engines to vary the noted parameters based on the impact on other aspects of the gas turbine engines; rechecking the operability and resonance frequency characteristics of the redesigned gas turbine engines; etc. during the design of several different types of systems for introducing airflow to the rotor cavity, including the systems described herein, which are described below in greater detail.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine is a high-bypass turbofan jet engine. As shown in FIG. 1, the gas turbine engine 10 defines an axial direction A (extending parallel to a longitudinal centerline 12 provided for reference) and a radial direction R. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a working gas flowpath 37 extending therethrough.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP spool 36 across a power gearbox 46. The power gearbox 46 includes a plurality of gears for stepping down the rotational speed of the LP spool 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, in other exemplary embodiments, the gas turbine engine 10 may be a direct drive turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, a land-based gas turbine engine for power generation, an aeroderivative gas turbine engine, etc.

Figure 2:
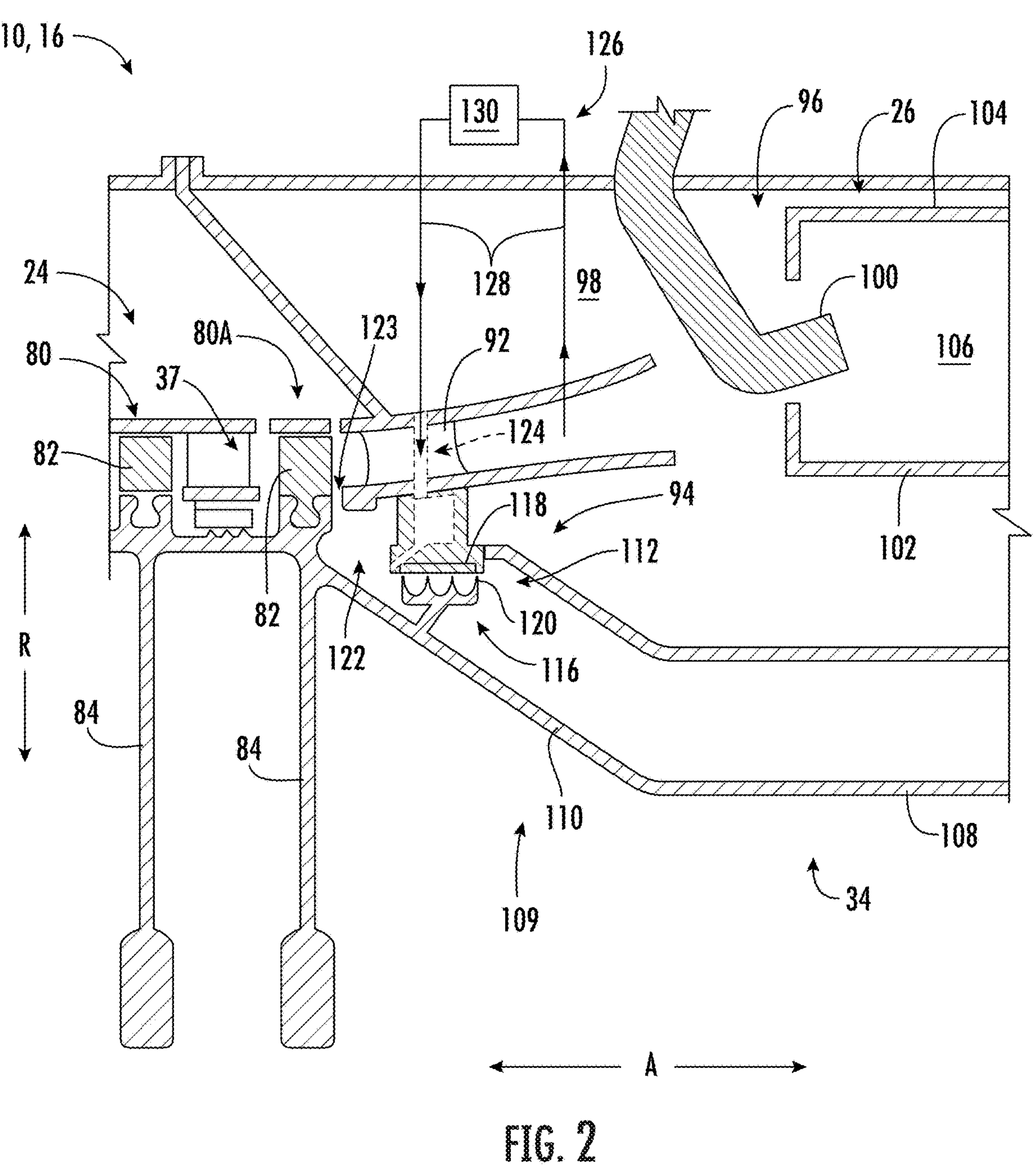
FIG. 2 is a schematic, cross-sectional view of a portion of a compressor section and of a combustion section of the exemplary gas turbine engine.

Referring now to FIG. 2, a schematic, cross-sectional view is provided of a portion of the compressor section and of the combustion section 26 of the exemplary gas turbine engine 10 of FIG. 1. More specifically, FIG. 2 depicts an aft end of the HP compressor 24 of the compressor section, in addition to the combustion section 26.

As noted above, during operation of the gas turbine engine 10, an airflow through the working gas flowpath 37 of the gas turbine engine 10 is sequentially compressed as it flows through the compressor section, or more specifically, as it flows through the LP compressor 22 and the HP compressor 24. The compressed air from the compressor section is then provided to the combustion section 26, wherein at least a portion of the compressed air is mixed with fuel and burned to create the combustion gases 66. The combustion gases 66 flow from the combustion section 26 to the turbine section, and more specifically, sequentially through the HP turbine 28 and the LP turbine 30, for the embodiment depicted, driving the HP turbine 28 and the LP turbine 30 (see FIG. 1). The HP spool 34 is drivingly coupled to both the HP turbine 28 and the HP compressor 24 (see FIG. 1).

Referring particularly to FIG. 2, the HP compressor 24 includes a plurality of compressor stages 80, with each compressor stage 80 including, e.g., a plurality of HP compressor rotor blades 82 and a rotor 84. Each of the various compressor stages 80 is drivingly coupled to the HP spool 34, such that the HP turbine 28 may drive the HP compressor 24 through the HP spool 34. Amongst the plurality of compressor stages 80 of HP compressor 24, is an aft-most compressor stage 80A located at an aft end of the HP compressor 24. The compressor rotor blades 82 of the aft-most compressor stage 80A are attached to the respective rotor 84 of the aft-most compressor stage 80A.

The aft-most compressor stage 80A provides compressed air to the combustion section 26. More specifically, in the embodiment depicted, the gas turbine engine 10 includes a stage of stator vanes located downstream of the aft-most compressor stage 80A, fluidly connecting the aft-most compressor stage 80A of the HP compressor 24 to the combustion section 26. More specifically, for the embodiment depicted, the stage of stator vanes is configured as a stage of discharge nozzles 92 fluidly connecting the aft-most compressor stage 80A of the HP compressor 24 to the combustion section 26.

More specifically, the combustion section 26 defines a diffuser cavity 98, with the stage of discharge nozzles 92 located downstream of the aft-most compressor stage 80A of the HP compressor 24 and upstream of the diffuser cavity 98, such that compressed air from the aft-most compressor stage 80A is provided to the diffuser cavity 98 through the stage of discharge nozzles 92. The compressed air within the diffuser cavity 98 is, in turn, provided to a combustor assembly 96, where it is mixed with fuel and burned to generate the combustion gases 66. As is depicted, the combustor assembly 96 generally includes a fuel nozzle 100, an inner liner 102, and an outer liner 104, with the inner and outer liners 102, 104 together forming a combustion chamber 106. It should be appreciated that the combustor assembly 96 may be configured as any suitable combustor assembly 96 for the gas turbine engine 10. For example, in certain embodiments, the combustor assembly 96 may be configured as an annular combustor assembly, a can combustor assembly, or a cannular combustor assembly.

Referring still to FIG. 2, as previously noted, the HP spool 34 is drivingly connected to the HP compressor 24. For the embodiment depicted, the HP spool 34 generally includes a central spool section including a central spool member 108 and a forward spool section 109 including a forward spool member 110. The central spool member 108 extends, for the embodiment depicted, generally along the axial direction A at a location radially inward of the combustor assembly 96 of the combustion section 26. In certain exemplary embodiments, the central spool member 108 may define a substantially cylindrical shape. The forward spool member 110 extends generally from the central spool member 108 to the aft-most compressor stage 80A of the HP compressor 24 of the compressor section. More particularly, for the embodiment depicted, the HP spool 34 forms, in part, a compressor discharge pressure seal 112.

Further, as is depicted, for the embodiment of FIG. 2, the engine includes a stator case 94 coupled to the stage of discharge nozzles 92 at a location inward of the stage of discharge nozzles 92 along the radial direction R. The stator case 94 also forms in part the compressor discharge pressure seal 112, such that the HP spool 34 forms the compressor discharge pressure seal 112 with the stator case 94. As is depicted, the stator case 94 forms a stator portion of the compressor discharge pressure seal 112 and the HP spool 34 forms a rotor portion 116 of the compressor discharge pressure seal 112 (the rotor portion 116 being rotatable relative to the stator portion). The stator portion generally includes a seal pad 118 and the rotor portion 116 generally includes a plurality of seal teeth 120 configured to form a seal with the seal pad 118. As will be appreciated, the rotor portion 116 is generally cantilevered from the forward spool member 110.

It should be appreciated, however, that in other exemplary embodiments, the compressor discharge pressure seal 112 may have any other suitable configuration.

Referring still to FIG. 2, it will be appreciated that the HP spool 34 and stator case 94 together define a rotor cavity 122 in fluid communication with the working gas flowpath 37. In particular, the rotor cavity 122 extends between a rotor cavity opening 123 fluidly connecting the rotor cavity 122 with the working gas flowpath 37 and the compressor discharge pressure seal 112.

Further, it will be appreciated from the view of FIG. 2 that the gas turbine engine 10 further includes a system for providing an airflow to the rotor cavity 122 to, e.g., affect an acoustic resonance frequency one or more components exposed to the rotor cavity 122. In particular, the stage of discharge nozzles 92 includes a first discharge nozzle 92 defining a fluid passage 124 therethrough. For the embodiment of FIG. 2, the fluid passage 124 of the first discharge nozzle 92 is in fluid communication with a compressor of the compressor section, and configured to receive a bleed airflow from the compressor section. More specifically, the fluid passage 124 of the first discharge nozzle 92 is configured to receive bleed airflow from the HP compressor 24, and more specifically still, from the aft-most compressor stage 80A of the HP compressor 24. In particular, the gas turbine engine 10 includes an airflow delivery system 126 having an airflow conduit 128 configured to receive the bleed airflow and provide the bleed airflow to the first discharge nozzle 92.

As will be appreciated, the airflow through the working gas flowpath 37 exiting the HP compressor 24 defines a compressor exit temperature, $T_3$, in degrees Rankine during an operating condition of the gas turbine engine 10 (e.g., a takeoff operating condition, a climb operating condition, or a cruise operating condition). The airflow provided through the airflow delivery system 126 may be at a passage temperature, $T_P$, in degrees Rankine during the operating condition when the airflow is provided to the rotor cavity 122, as will be explained in more detail below. In at least certain exemplary embodiments, it may be useful for the passage temperature, $T_P$, to be less than the compressor exit temperature, $T_3$, to affect an acoustic resonance frequency of the rotor section 116 of the compressor discharge pressure seal 112 in a desired manner. In particular, for the embodiment depicted, the gas turbine engine 10 includes a heat exchanger 130 in fluid communication with the fluid passage 124 of the first discharge nozzle 92 at a location downstream of the compressor section and upstream of the first discharge nozzle 92. More specifically, the heat exchanger 130 is in thermal communication with the airflow conduit 128 for reducing it temperature of the bleed airflow through the airflow conduit. The airflow conduit 128, for the embodiment depicted, is configured to receive the bleed airflow from the diffuser cavity 98 and provide the bleed airflow to the fluid passage 124.

Although not depicted, it will be appreciated that the heat exchanger 130 may be further thermally coupled to a heat sink, such as a bypass airflow passage 56 of the gas turbine engine 10, a fuel flow to the combustion section 26 of the gas turbine engine 10, etc. Further, a controller (not depicted) of the gas turbine engine 10 may be operably coupled to one or more components to control an amount of heat rejection by the heat exchanger 130.

Figure 3:
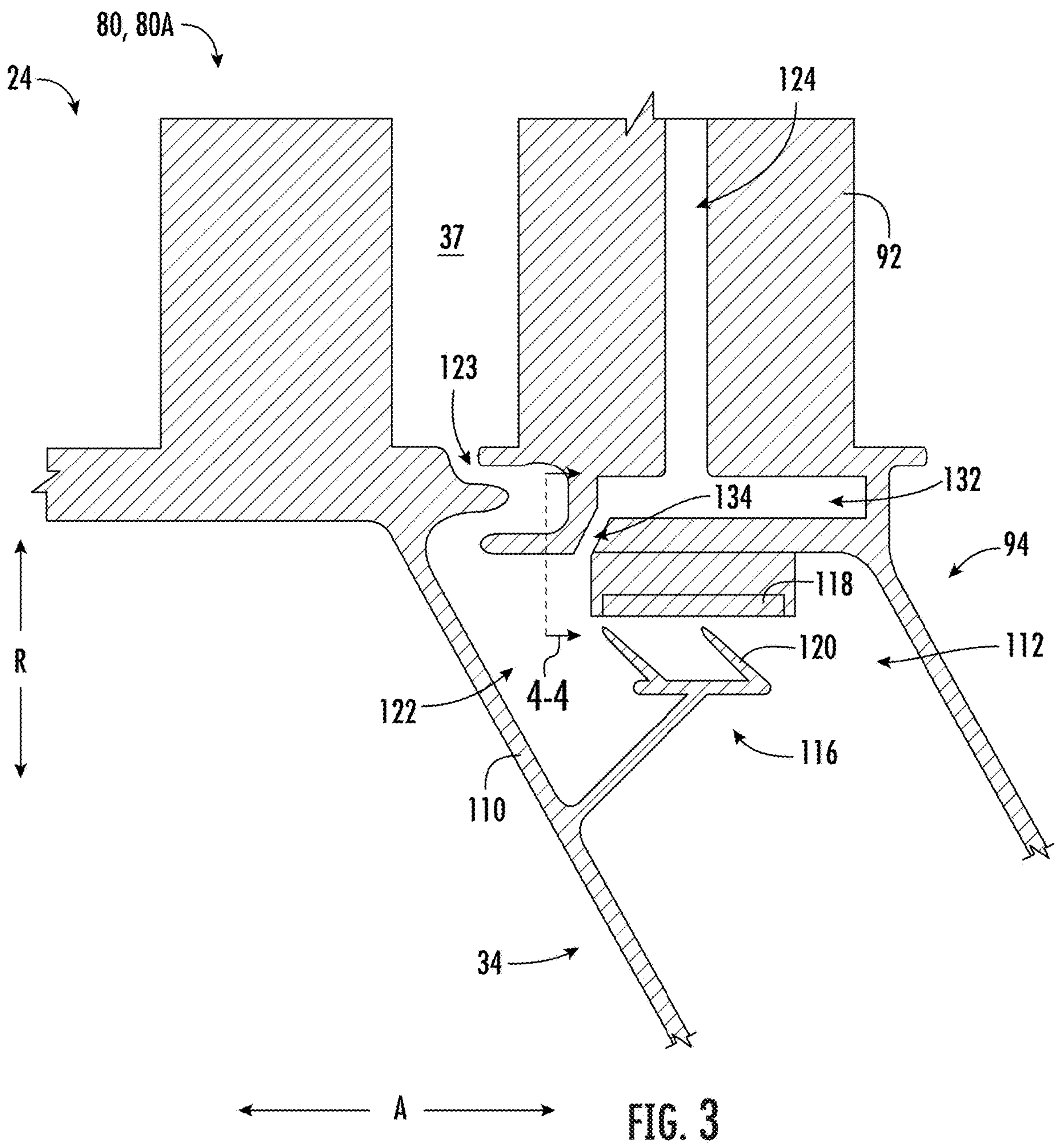
FIG. 3 is, a close-up, schematic view of a stage of discharge nozzles and an aft-most compressor stage of a compressor of the exemplary embodiment of FIG. 2.

Referring now also to FIG. 3, a close-up, schematic view is provided of the stage of discharge nozzles 92 and the aft-most compressor stage 80A of the HP compressor 24 described above with reference to FIG. 2.

As will be appreciated, for the embodiment shown the stator case 94 further defines a plenum 132 and a supplemental airflow passage 134. The plenum 132 is in fluid communication with the fluid passage 124 in the first discharge nozzle 92 (which, as described above, receives the bleed airflow from the compressor section in the embodiment depicted), and the supplemental airflow passage 134 is in fluid communication with the plenum 132 and the rotor cavity 122 for providing a supplemental airflow to the rotor cavity 122 from the plenum 132 and fluid passage 124. The supplemental airflow provided to the rotor cavity 122 may act to both purge the rotor cavity 122 and affect an acoustic resonance frequency of the rotor section 116 of the compressor discharge pressure seal 112.

Briefly, it will be appreciated that the stator case 94 and HP spool 34 further defines the supplemental airflow passage 134. The rotor cavity opening 123 is defined at a location having a minimum cross-sectional area between the rotor cavity 122 and the working gas flowpath. The minimum cross-sectional area may be referred to as a cross-sectional area, $A_{FO}$, of the rotor cavity opening 123.

Figure 4:
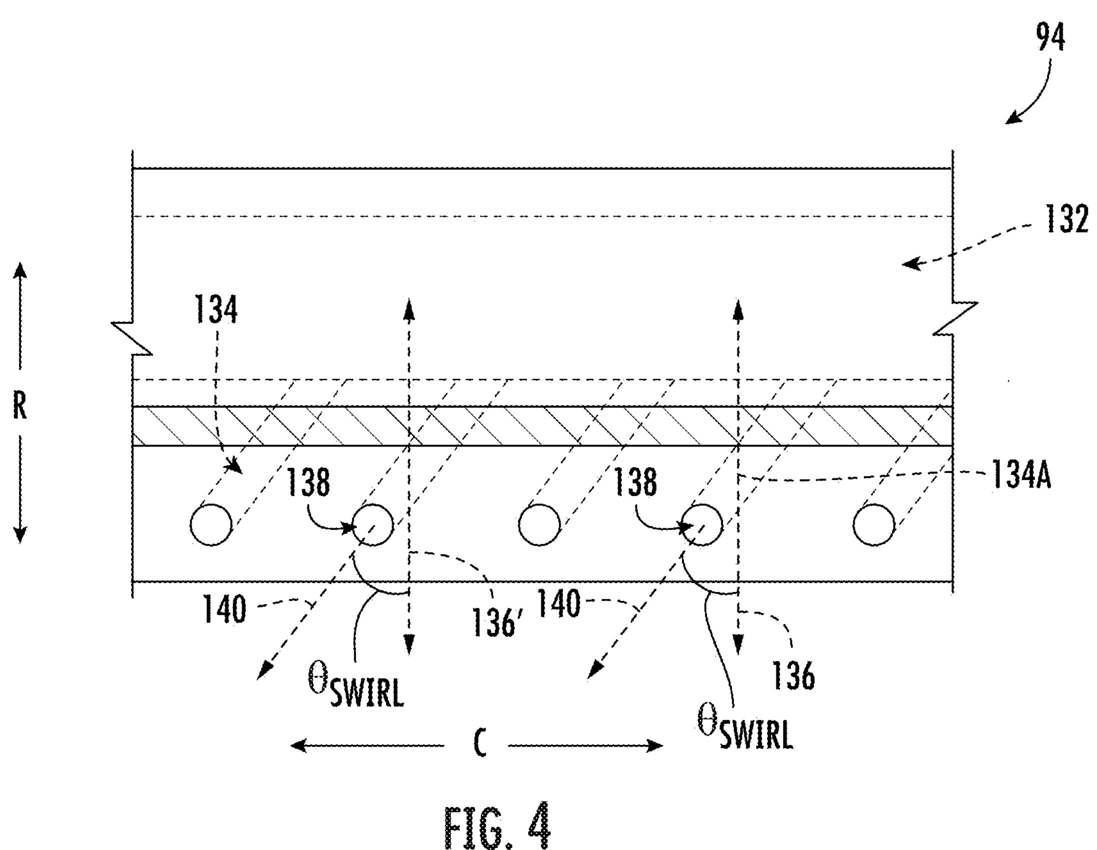
FIG. 4 is a forward-looking-aft view of a section of a stator case of FIG. 3, as is indicated by Line 4-4 in FIG. 3.

Further, referring now to FIG. 4, a forward-looking-aft view is provided of a section of the stator case 94, as is indicated by Line 4-4 in FIG. 3.

As noted above, the stator case 94 defines the plenum 132 and the supplemental airflow passage 134. More specifically, for the embodiment depicted the plenum 132 extends in a circumferential direction C of the gas turbine engine 10. Further, the supplemental airflow passage 134 is a first supplemental airflow passage 134A of an array of supplemental airflow passages 134 defined by the stator case 94. Each supplemental airflow passage 134 in the array of supplemental airflow passages 134 is fluidly coupled to the plenum 132 and to the rotor cavity 122 for providing the supplemental airflow to the rotor cavity 122. The array of supplemental airflow passages 134 is arranged along the circumferential direction C of the gas turbine engine 10, such that the array of supplemental airflow passages 134 may provide the airflow to the rotor cavity 122 in a distributed manner along the circumferential direction C.

As briefly mentioned above, a swirl angle, $\theta_{Swirl}$, at which the supplemental airflow is provided to the rotor cavity 122 may further affect the acoustic resonance frequency of the rotor section 116 of the compressor discharge pressure seal 112. For the embodiment of FIG. 4, the array of supplemental airflow passages 134 is arranged to provide the supplemental airflow to the rotor cavity 122 at a swirl angle, $\theta_{Swirl}$, greater than zero degrees. For example, the gas turbine engine 10 defines a reference plane 136 extending in the axial direction A (see FIG. 3; into the page in the view of FIG. 4) and the radial direction R, with the first supplemental airflow passage 134A passing through the reference plane 136. The first supplemental airflow passage 134A includes an airflow outlet 138 defining an airflow outlet direction 140. The airflow outlet direction 140 defines the swirl angle, $\theta_{Swirl}$, greater than 0 degrees with the reference plane 136. In particular, for the embodiment depicted, the swirl angle, $\theta_{Swirl}$, with the reference plane 136 and is greater than 0 degrees and less than or equal to 85 degrees. For example, the swirl angle, $\theta_{Swirl}$, may be greater than or equal to 15 degrees and less than or equal to 75 degrees.

Notably, it will be appreciated that each of the plurality of supplemental airflow passages 134 are configured in a similar manner as the first supplemental airflow passage 134A. In particular, each supplemental airflow passage 134 of the plurality of supplemental airflow passages 134 similarly defines an airflow outlet direction 140 defining a swirl angle, $\theta_{Swirl}$, with a local reference plane (see, e.g., local reference plane 136'), each local reference plane passing through a respective supplemental airflow passage 134 of the plurality of supplemental airflow passages 134 and extending in the axial direction A (see FIG. 3) and the radial direction R. Each of the swirl angles, $\theta_{Swirl}$, may be the same as the swirl angle, $\theta_{Swirl}$, defined by the airflow outlet direction 140 of the airflow outlet 138 of the first supplemental airflow passage 134A, noted above.

Briefly, it will be appreciated that the airflow outlets 138 of all the supplemental airflow passages 134 may collectively define a total cross-sectional area, $A_{SAP\_Total}$. A ratio of the cross-sectional area, $A_{FO}$, of the rotor cavity opening 123 to the cross-sectional area, $A_{SAP\_Total}$, of the plurality of supplemental airflow passages ($A_{FO}$ to $A_{SAP\_Total}$) may affect an ability of the supplemental airflow passages to effect the desired change described herein.

It will be appreciated that although a single discharge nozzle 92 is depicted including the fluid passage 124 (see, e.g., FIGS. 2 and 3), in other exemplary embodiments, the gas turbine engine 10 may include a plurality of discharge nozzles 92 arranged in the circumferential direction C, each including one or more respective fluid passage(s) 124, with each fluid passage 124 fluidly coupled to the plenum 132. Additionally, alternatively, the stator case 94 may include a plurality of plenums 132 arranged along the circumferential direction C, with each plenum 132 fluidly coupled to one or more fluid passages 124 extending through a respective one or more discharge nozzles 92.

As alluded to earlier, the inventors discovered, unexpectedly during the course of designing gas turbine engines which provide airflow to a rotor cavity—e.g., designing gas turbine engines which provide airflow to a rotor cavity at a variety of different temperatures and at a variety of different swirl angles, and evaluating an overall engine performance and resonance frequency characteristics—a significant relationship exists among a temperature of the airflow provided to the rotor cavity (relative to a compressor exit temperature) and a circumferential angle, or swirl angle, at which the airflow is provided to the rotor cavity. The relationship is an indicator of the ability of a gas turbine engine to effectively increase a margin between acoustic and mechanical resonance frequencies of a cantilevered member exposed to the rotor cavity.

The relationship applies to a gas turbine engine configured to provide a supplemental airflow to a rotor cavity extending between a working gas flowpath of the gas turbine engine and a seal having a cantilevered member. The relationship ties the swirl angle at which the submental airflow is provided to the rotor cavity to a temperature ratio of the airflow provided to the rotor cavity, to identify systems capable of achieving the desired increase in margin between acoustic and mechanical resonance frequencies of the cantilever member, as described herein.

In particular, the inventors of the present disclosure found that by incorporating a circumferential swirl into the rotor cavity having the cantilever member exposed thereto may act to counter airflow pressure pulses through the rotor cavity imparted in part by the passing of rotor blades of the aft-most stage of the HP compressor. In such a manner, the inventors found that the effect of the airflow pressure pulses from the rotor blades is reduced such that the cantilevered member is less susceptible to oscillations. In such a manner, more swirl generally results in reduced effect and reduced oscillations.

However, the inventors further found that utilizing too high of a swirl angle may be counter effective as it may result in a design that is difficult to manufacture and introduces inefficiencies in the airflow delivery path.

Further, the inventors of the present disclosure found that by reducing a temperature of the supplemental airflow provided to the rotor cavity, the acoustic residence frequency of the cantilever member may be affected to increase the margin between the acoustic and mechanical resonance frequencies. In particular, the inventors found that the acoustic resonance frequency of the cantilevered member is a function of temperature, such that reducing the temperature changes the acoustic resonance frequency.

However, the inventors found that by incorporating a temperature reduction past a certain threshold in the supplemental airflow provided to the rotor cavity may have a reduced benefit, as it relates to an amount of energy required to achieve such a temperature reduction.

Briefly, the inventors further found that to ensure the swirl introduced to the rotor cavity and/or temperature varying supplemental airflow has the desired affect, the inventors found that a size of the openings providing the supplemental airflow must be within a certain relative size range of a cross-sectional area of a rotor cavity opening of the rotor cavity By maintaining a ratio of the cross sectional area of the rotor cavity opening to a total cross-sectional area of the plurality of openings within a certain range, the supplemental airflow provided to the rotor cavity has the desired effect described herein.

The relationship discovered, infra, can therefore identify a gas turbine engine which provide airflow to a rotor cavity capable of achieving a desired increase in margin between acoustic and mechanical resonance frequencies of the cantilevered member, while avoiding a prohibitive decrease in efficiency of the gas turbine engine and other downsides described above, and suited for a particular mission requirements, one that takes into account efficiency, weight, complexity, reliability, and other factors influencing the optimal choice for a gas turbine engine which provide airflow to a rotor cavity.

In addition to yielding an improved gas turbine engine which provides supplemental airflow to a rotor cavity, as explained in detail above, utilizing this relationship, the inventors found that the number of suitable or feasible gas turbine engine designs capable of meeting the above design requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit also avoids late-stage redesign.

The desired relationship providing for the improved gas turbine engine, discovered by the inventors, is a relationship between a swirl angle of the supplemental airflow passage(s) define by a stator case and a supplemental airflow temperature ratio (SATR), expressed as:

$$SATR = T_P / T_3,$$

where $T_P$ is a passage temperature in degrees Rankine during an operating condition of the gas turbine engine, and $T_3$ is a compressor exit temperature in degrees Rankine during the operating condition of the gas turbine engine. More specifically, the inventors of the present disclosure found that when the SATR is less than 1.0, such as less than or equal to 0.9, the swirl angle of the plurality of supplemental airflow passages should be greater than or equal to 0 degrees and less than or equal to 85 degrees, and when the SATR is greater than or equal to 1.0, the swirl angle of the plurality of supplemental airflow passages should greater than 0 degrees and less than or equal to 85 degrees. Such a configuration may allow the gas turbine engine to achieve the desired increase in margin between the acoustic and mechanical resonance frequencies of the cantilevered member.

Figure 6:
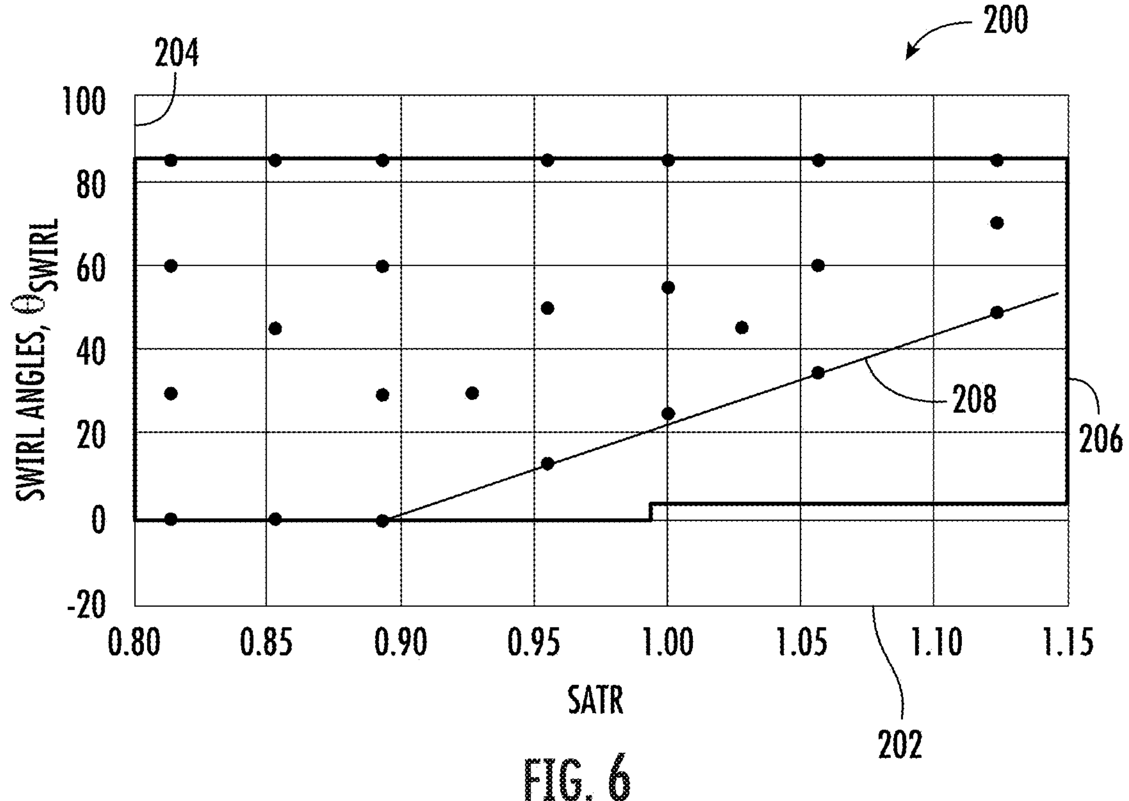
FIG. 6 provides a plot of SATR values one an x-axis and swirl angles, $\theta_{Swirl}$, on a Y-axis.

Referring now to FIGS. 5 and 6, various gas turbine engines in accordance with one or more aspects of the present disclosure that may provide a supplemental airflow to a rotor cavity through an array of supplemental airflow passages are provided. FIG. 5 provides a table including numerical values corresponding to several gas turbine engines falling within the ranges depicted in FIG. 6. FIG. 6 provides a plot 200 of SATR values one an x-axis 202 and swirl angles, $\theta_{Swirl}$, on a Y-axis 204.

As shown in FIG. 6, the plot 200 depicts a first range 206, with the swirl angle, $\theta_{Swirl}$, of the plurality of supplemental airflow passages being greater than or equal to 0 degrees and less than or equal to 85 degrees when the SATR values are greater than or equal to 0.8 and less than 1, and with the swirl angle, $\theta_{Swirl}$, of the plurality of supplemental airflow passages being greater than 0 degrees and less than or equal to 85 degrees when the SATR values are greater than or equal to 1 and less than or equal to 1.15. Additionally, FIG. 6 depicts a second range 208, which is a subset of the first range 206, wherein the relationship between swirl angle and SATR is further provided by the following relationship:

$$\theta \geq 199 \times SATR^2 - 186 \times SATR + 7.$$

The inventors of the present disclosure found that a gas turbine engine having a plurality of supplemental airflow passages configured to provide airflow to the rotor cavity in such a manner may effectively increase the margin between the acoustic and mechanical resonance frequencies of the cantilevered member.

A working gas flowpath 37 opening of the rotor cavity defines a cross-sectional area, $A_{FO}$, and the plurality of supplemental airflow passages define a total cross-sectional area, $A_{SAP\_Total}$. The inventors of the present disclosure further found that a ratio of the cross-sectional area, $A_{FO}$, of the working gas flowpath 37 opening to the cross-sectional area, $A_{SAP\_Total}$, of the plurality of supplemental airflow passages ($A_{FO}$ to $A_{SAP\_Total}$) may further dictate whether or not the structure of the gas turbine engine may effectively increase the margin between the acoustic and mechanical resonance frequencies of the cantilevered member.

In particular, the inventors the present disclosure found that when the ratio, $A_{FO}$ to $A_{SAP\_Total}$, is greater than or equal to 0.05 and less than 0.25, a structure of the gas turbine engine, configured in accordance with one or more of the exemplary aspects noted above, may effectively increase the margin between the acoustic and mechanical resonance frequencies that may act on the cantilevered member. For example, the supplemental airflow may effectively influence the swirl of the airflow within the rotor cavity, may effectively influence a temperature of the airflow within the rotor cavity, or both.

Although the discussion above is generally related to a gas turbine engine having a thermal management system with a heat exchanger integrated into a stage of stator vanes (e.g., discharge nozzles), where the stator vanes each define an internal thermal fluid passage in fluid communication with a compressor through an airflow conduit, in other exemplary embodiments, other configurations may be provided as well.

Figure 7:
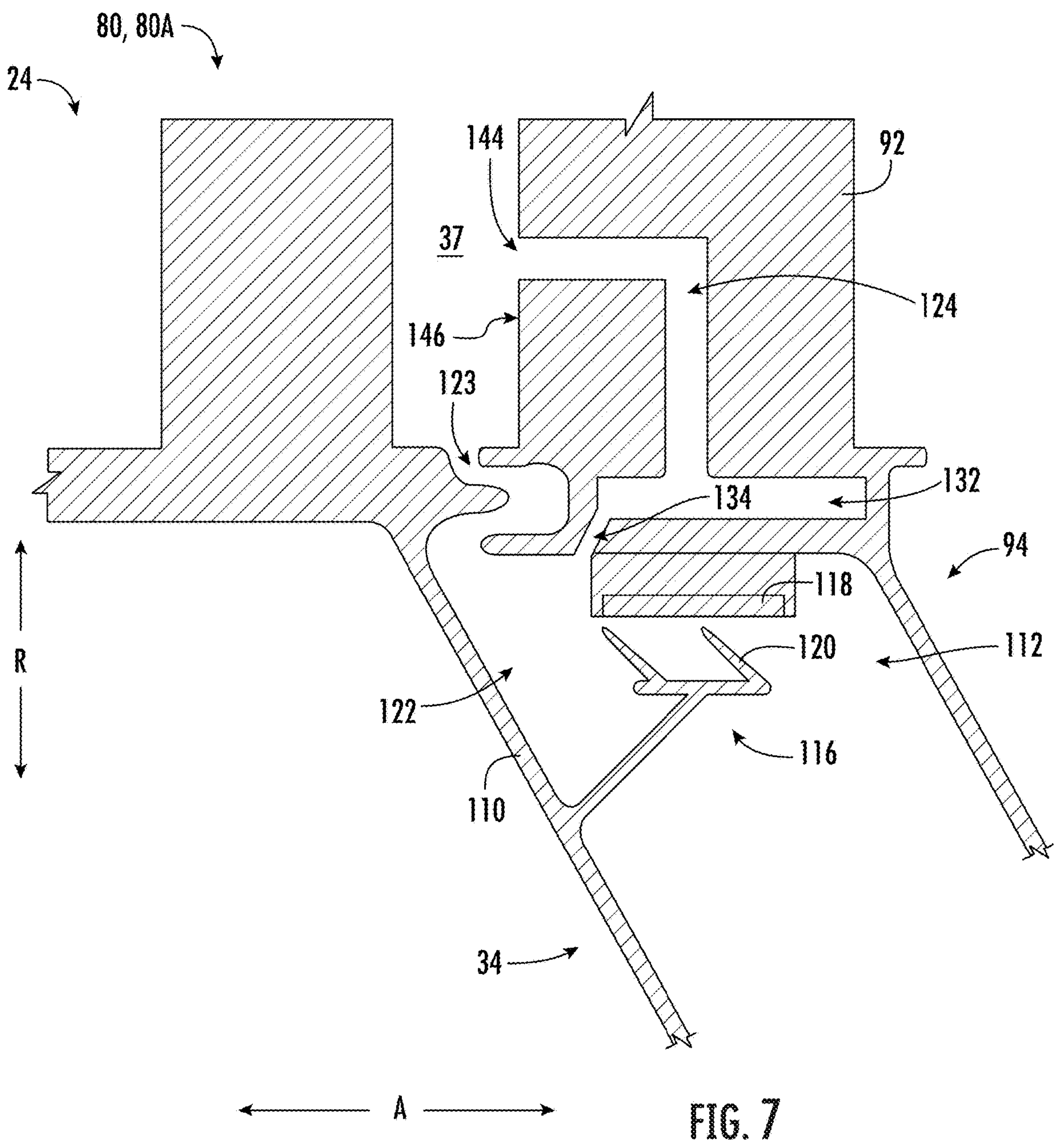
FIG. 7 is a close-up, schematic of a stage of stator vanes along with an aft-most compressor stage of an HP compressor of a gas turbine engine configured in accordance with another exemplary embodiment of the present disclosure.

For example, referring now to FIG. 7, a close-up, schematic view is provided of a stage of stator vanes, and more specifically of a stage of discharge nozzles 92, along with an aft-most compressor stage 80A of an HP compressor 24 of a gas turbine engine 10 configured in accordance with another exemplary embodiment of the present disclosure. The exemplary embodiment of FIG. 7 may be configured in substantially the same manner as the exemplary embodiment described above with reference to FIG. 3. The same or similar numbers may refer to the same or similar parts.

For example, the exemplary embodiment of FIG. 7 generally includes the stage of discharge nozzles 92 located downstream of the aft-most compressor stage 80A. The stage of discharge nozzles 92 generally includes a first discharge nozzle 92 defining a fluid passage 124. The fluid passage 124 of the first discharge nozzle 92 is in fluid communication with the HP compressor 24, is in direct fluid communication with the working gas flowpath 37 through the stage of discharge nozzles 92, or both. More specifically, for the embodiment depicted, the fluid passage 124 of the first discharge nozzle 92 is in direct fluid communication with the working gas flowpath 37 through the stage of discharge nozzles 92. In particular, the first discharge nozzle 92 defines an opening 144 in an outer surface 146 at a location within the working gas flowpath 37 for receiving an airflow directly from the working gas flowpath 37. The opening 144 more specifically is at a leading edge in the embodiment depicted. The fluid passage 124 is in fluid communication with the opening 144 to receive the airflow.

Although the opening 144 is depicted at a leading edge of the first discharge nozzle 92, in other embodiments, the opening 144 may be positioned on a pressure side of the discharge nozzle 92, on a suction side of first discharge nozzle 92, or at any other suitable location. Further, although a single opening 144 is depicted in FIG. 7 in other embodiments the first discharge nozzle 92 may define a plurality of openings 144 in fluid communication with the fluid passage 124, positioned at any suitable location(s).

As will be appreciated, with the configuration of FIG. 7, a SATR value (e.g., a ratio of a passage temperature, $T_P$, in degrees Rankine during an operating condition of the gas turbine engine to a compressor exit temperature, $T_3$, in degrees Rankine during the operating condition of the gas turbine engine) may be equal to 1, or even greater than one. Accordingly, in order to achieve the benefits described hereinabove, a plurality of supplemental airflow passages 134 defined by a stator case 94 may define a swirl angle, $\theta_{Swirl}$, greater than 0 degrees.

Figure 8:
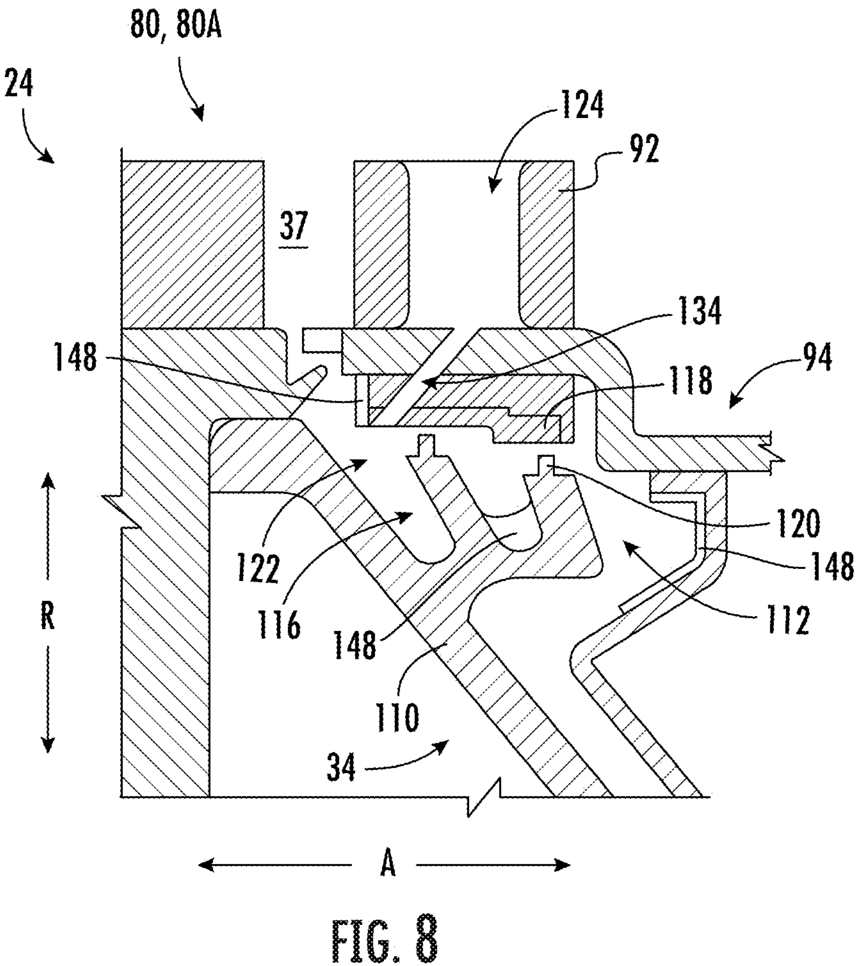
FIG. 8 is a close-up, schematic of a stage of stator vanes along with an aft-most compressor stage of an HP compressor of a gas turbine engine configured in accordance with yet another exemplary embodiment of the present disclosure.

Further, referring now to FIG. 8, a close-up, schematic view is provided of a stage of discharge nozzles 92 and an aft-most compressor stage 80A of an HP compressor 24 of a gas turbine engine 10 configured in accordance with yet another exemplary embodiment of the present disclosure. The exemplary embodiment of FIG. 8 may be configured in substantially the same manner as the exemplary embodiment described above with reference to FIG. 3. The same or similar numbers may refer to the same or similar parts.

For example, the exemplary embodiment of FIG. 8 generally includes a stator case 94 coupled to a stage of discharge nozzles 92. In the embodiment depicted, the stator case 94 includes a strip of anti-swirl material 148 exposed to the rotor cavity 122 to assist with controlling a swirl within the rotor cavity 122. The strip of anti-swirl material 148 may be a strip of corrugated material, for the embodiment depicted, positioned on a forward side of the stator case 94.

Further, for the embodiment depicted, the stator case 94 further includes a second strip of anti-swirl material 148 positioned at a location downstream of a compressor discharge pressure seal 112 and a third strip of anti-swirl material 148 positioned between adjacent teeth 120 of a rotor section 116 of the compressor discharge pressure seal 112. The second and third strips of anti-swirl material 148 may further assist with controlling a swirl between the stator case 94 and the HP spool 34.

Briefly, it will further be appreciated that for the exemplary embodiment of FIG. 8, the stator case 94 does not define a dedicated plenum, and instead is configured to provide a supplemental airflow from the fluid passage 124 through the discharge nozzle 92 directly to one or more supplemental airflow passages 134 defined in the stator case 94.

Figure 9:
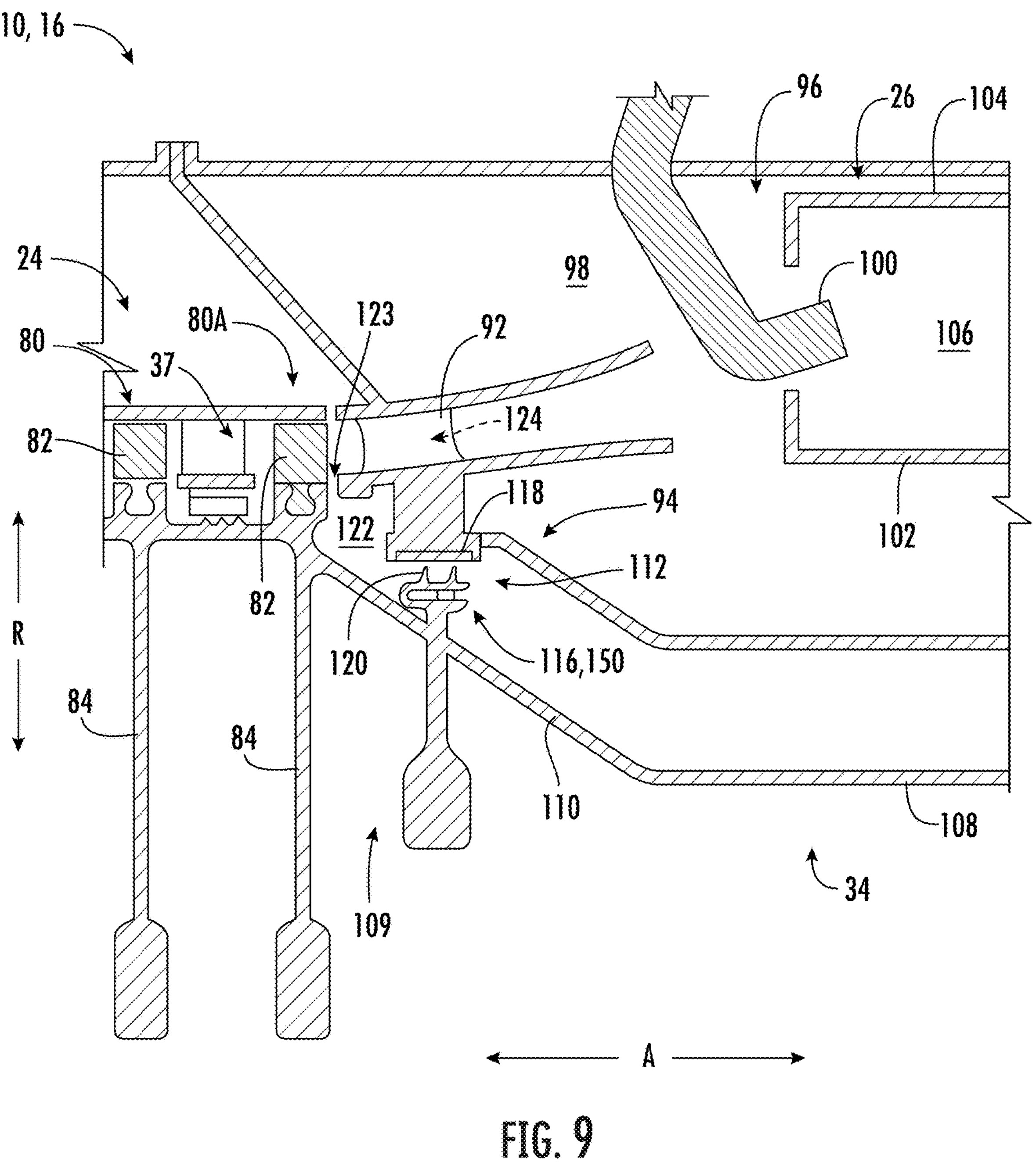
FIG. 9 is a schematic, cross-sectional view of a portion of a compressor section and of a combustion section of a gas turbine engine in accordance with an exemplary aspect of the present disclosure.

Referring now to FIG. 9, a schematic, cross-sectional view is provided of a portion of a compressor section and of a combustion section 26 of a gas turbine engine 10 in accordance with another exemplary embodiment of the present disclosure. In at least certain exemplary embodiments, the gas turbine engine 10 may be configured in a similar manner as the exemplary gas turbine engine 10 of FIG. 1. The same or similar number may refer to the same or similar parts.

As is depicted in FIG. 9, an HP compressor 24 of the compressor section includes a plurality of compressor stages 80, with each compressor stage 80 including, e.g., a plurality of HP compressor rotor blades 82 and a rotor 84. Each of the various compressor stages 80 is drivingly coupled to an HP spool 34, such that an HP turbine 28 (see FIG. 1) may drive the HP compressor 24 through the HP spool 34. Amongst the plurality of compressor stages 80 of HP compressor 24, is an aft-most compressor stage 80A located at an aft end of the HP compressor 24. The compressor rotor blades 82 of the aft-most compressor stage 80A are attached to the respective rotor 84 of the aft-most compressor stage 80A.

The aft-most compressor stage 80A provides compressed air to the combustion section 26. More specifically, in the embodiment depicted, the gas turbine engine 10 includes a stage of stator vanes located downstream of the aft-most compressor stage 80A, fluidly connecting the aft-most compressor stage 80A of the HP compressor 24 to the combustion section 26. More specifically, for the embodiment depicted, the stage of stator vanes is configured as a stage of discharge nozzles 92 fluidly connecting the aft-most compressor stage 80A of the HP compressor 24 to the combustion section 26.

More specifically, the combustion section 26 defines a diffuser cavity 98, with the stage of discharge nozzles 92 located downstream of the aft-most compressor stage 80A of the HP compressor 24 and upstream of the diffuser cavity 98, such that compressed air from the aft-most compressor stage 80A is provided to the diffuser cavity 98 through the stage of discharge nozzles 92. The compressed air within the diffuser cavity 98 is, in turn, provided to a combustor assembly 96, where it is mixed with fuel and burned to generate the combustion gases 66. As is depicted, the combustor assembly 96 generally includes a fuel nozzle 100, an inner liner 102, and an outer liner 104, with the inner and outer liners 102, 104 together forming a combustion chamber 106. It should be appreciated that the combustor assembly 96 may be configured as any suitable combustor assembly 96 for the gas turbine engine 10. For example, in certain embodiments, the combustor assembly 96 may be configured as an annular combustor assembly, a can combustor assembly, or a cannular combustor assembly.

Referring still to FIG. 9, as previously noted, the HP spool 34 is drivingly connected to the HP compressor 24. For the embodiment depicted, the HP spool 34 generally includes a central spool section including a central spool member 108 and a forward spool section 109 including a forward spool member 110. The central spool member 108 extends, for the embodiment depicted, generally along an axial direction A at a location inward of the combustor assembly 96 of the combustion section 26 along a radial direction R. In certain exemplary embodiments, the central spool member 108 defines a substantially cylindrical shape. The forward spool member 110 extends generally from the central spool member 108 to the aft-most compressor stage 80A of the HP compressor 24 of the compressor section. More particularly, for the embodiment depicted, the HP spool 34 forms, in part, a compressor discharge pressure seal 112.

Further, as is depicted, for the embodiment of FIG. 9, the engine includes a stator case 94 coupled to the stage of discharge nozzles 92 at a location inward of the stage of discharge nozzles 92 along the radial direction R. The stator case 94 also forms in part the compressor discharge pressure seal 112, such that the HP spool 34 forms the compressor discharge pressure seal 112 with the stator case 94. As is depicted, the stator case 94 forms a stator portion of the compressor discharge pressure seal 112 and the HP spool 34 forms a rotor portion 116 of the compressor discharge pressure seal 112 (the rotor portion 116 being rotatable relative to the stator portion). The stator portion generally includes a seal pad 118 and the rotor portion 116 generally includes a plurality of seal teeth 120 configured to form a seal with the seal pad 118.

It should be appreciated, however, that in other exemplary embodiments, the compressor discharge pressure seal 112 may have any other suitable configuration.

Referring still to FIG. 9, it will be appreciated that the HP spool 34, and more specifically, the rotor portion 116 of the compressor discharge pressure seal 112, includes a seal tooth assembly 150.

Figure 10:
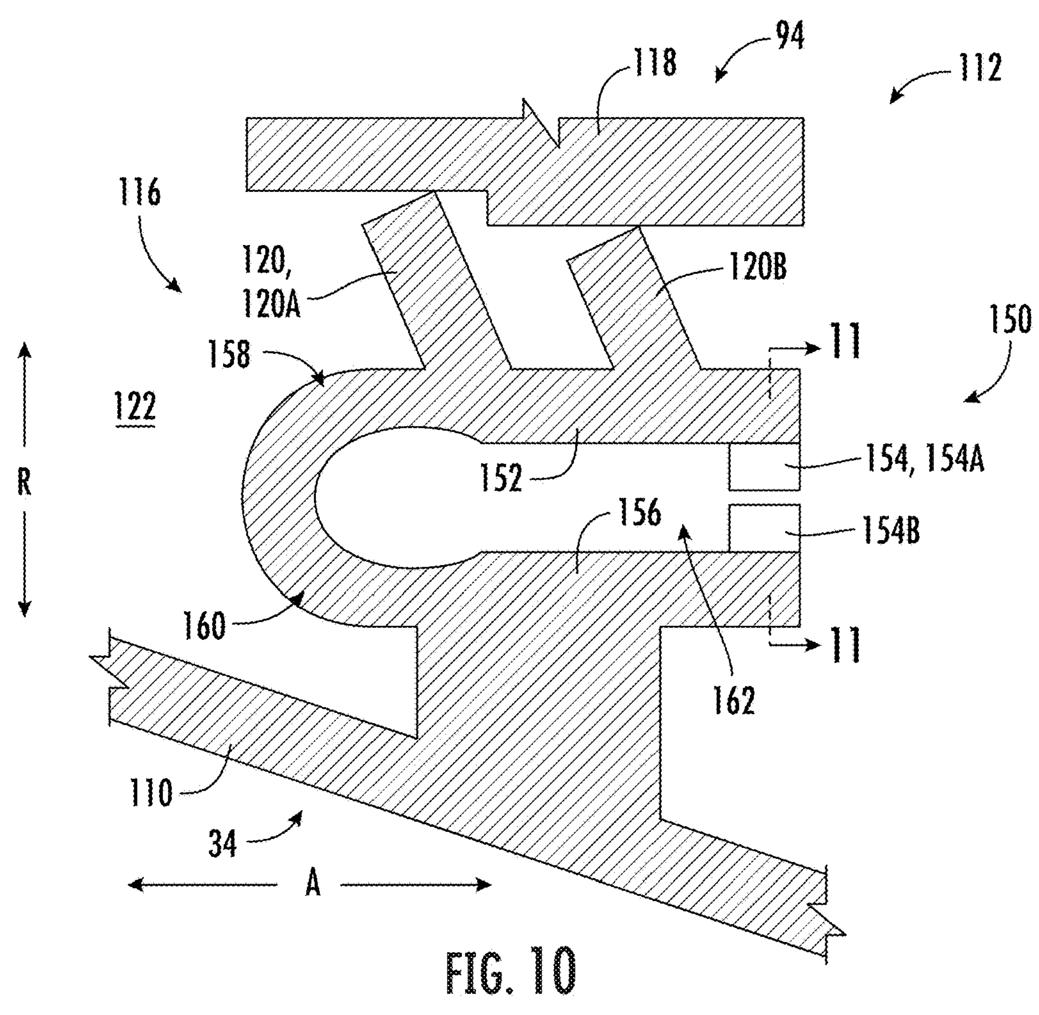
FIG. 10 is a close-up, schematic view of a seal tooth assembly in accordance with an exemplary aspect of the present disclosure.

Referring now to FIG. 10, a close-up, schematic view is provided of a seal tooth assembly 150 in accordance with an exemplary aspect of the present disclosure. Exemplary seal tooth assembly 150 of FIG. 10 may be configured in substantially the same manner as the exemplary seal tooth assembly 150 described above with reference to FIG. 9.

For the embodiment shown, the seal tooth assembly 150 includes a seal tooth 120, and more specifically, a first seal tooth 120A and a second seal tooth 120B, extending towards a seal pad 118 to prevent, or minimize, an airflow thereacross. Further, the seal tooth assembly 150 generally includes a seal support extension 152, with the first and second seal teeth 120A, 120B extending from the seal support extension 152 towards the seal pad 118 of a stator case 94, and a dampener 154 operable with the seal support extension 152 to dampen movement along a radial direction R.

Further, for the embodiment shown, the seal tooth assembly 150 further includes a base extension 156 extending substantially parallel to the seal support extension 152 (e.g., within 15 degrees of one another), with the dampener 154 positioned between the base extension 156 and the seal support extension 152. In particular, for the embodiment depicted, the base extension 156 extends parallel to the seal support extension 152. Notably, in the embodiment depicted, both the seal support extension 152 and the base extension 156 extend along the axial direction A.

The seal support extension 152 is cantilevered from the base extension 156. In particular, the seal support extension 152 includes a forward end 158 and the base extension 156 similarly includes a forward end 160. The forward end 158 of the seal support extension 152 is coupled to the forward end 160 of the base extension 156. In such a manner, it will be appreciated that the seal support extension 152 may flex along the radial direction R in response to various operating conditions of the gas turbine engine 10. For example, it will be appreciated that a rotor cavity 122 is defined between stator case 94 and an HP spool 34 including the seal tooth assembly 150. The rotor cavity 122 may define a pressure that generally increases with a pressure at an exit of the HP compressor 24 (see FIG. 9). As the pressure within the rotor cavity 122 increases, the seal support extension 152 may generally flex inward along the radial direction R. Conversely, as a rotational speed of the HP spool 34 increases, centrifugal force may urge the seal support extension 152 to flex outward along the radial direction R.

Further, it will be appreciated that depending on certain operating conditions of the gas turbine engine 10, the seal support extension 152 may be susceptible to oscillations resulting from pressure fluctuations within the rotor cavity 122, i.e., acoustic resonances. The dampener 154 may be configured to dampen such oscillations, as described below.

Figure 11:
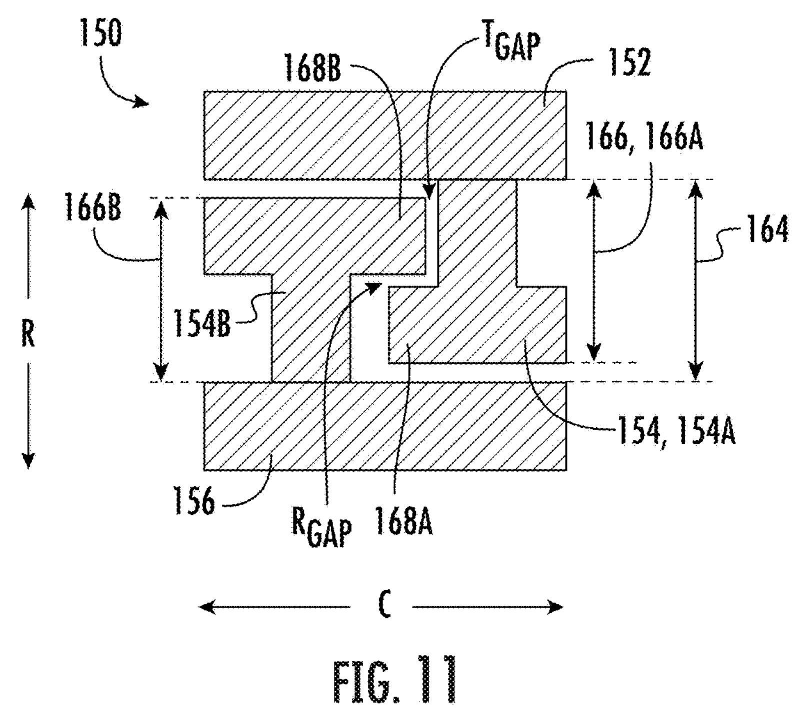
FIG. 11 is a schematic, cross-sectional view of the seal tooth assembly of FIG. 10, along Line 11-11 in FIG. 10.

Referring now to FIG. 11, providing a schematic, cross-sectional view of the seal tooth assembly 150 of FIG. 10, along Line 11-11 in FIG. 10, it will be appreciated that the seal support extension 152 and the base extension 156 define a gap 162 therebetween having a gap height 164 along the radial direction R. The gap height 164 may be defined when the gas turbine engine 10 is an off operating condition (i.e., when the HP spool 34 is not rotating). The dampener 154 similarly defines a dampener height 166 along the radial direction R that is less than the gap height 164.

More specifically, it will be appreciated that for the embodiment depicted the dampener 154 is a first dampener 154A coupled to an extending from the seal support extension 152, and that the dampener height 166 is a first dampener height 166A. The seal tooth assembly 150 further includes a second dampener 154B coupled to and extending from the base extension 156, and defining a second dampener height 166B along the radial direction R that is also less than the gap height 164. In such a manner, the first dampener 154A and the second dampener 154B may prevent movement of the seal support extension 152 towards the base extension 156 along the radial direction R more than a predetermined amount (i.e., may allow for a movement in an amount equal to a difference between the gap height 164 and the larger of the first dampener height 166A in the second dampener height 166B)

Moreover, as will be appreciated from the view of FIG. 11, the first dampener 154A defines a first lip 168A extending from a distal end of the first dampener 154A towards the second dampener 154B, and the second dampener 154B defines a second lip 168B extending from a distal end of the second dampener 154B towards the first dampener 154A. The first lip 168A and the second lip 168B are overlapping along the radial direction R (i.e., the first lip 168A and the second lip 168B each extend through a common circumferential position at an axial location). In such a manner, the first dampener 154A and the second dampener 154B may further prevent movement of the seal support extension 152 away from the base extension 156 along the radial direction R more than a predetermined amount (e.g., more than an amount equal to a gap along the radial direction R between the first lip 168A and the second lip 168B).

In particular, it will be appreciated that the first lip 168A and second lip 168B together define a radial gap, $R_{Gap}$, therebetween. Further, the second lip 168B defines a circumferential or transverse gap, $T_{Gap}$, between the second lip 168B and the first dampener 154A. In certain embodiments, the transverse gap, $T_{Gap}$, may be very small (e.g., less than 0.1 millimeter) or zero. With such a configuration, as the seal support extension 152 moves relative to the base extension 156, the second lip 168B may rub against the first dampener 154A, creating friction and dampening such relative movement. Further, when the seal support extension 152 moves towards the base extension 156 such that the first dampener 154A contacts the base extension 156 and the second dampener 154B contacts the seal support extension 152, friction between these components dampens relative circumferential movement between the seal support extension 152 and base extension 156. Such may occur when the seal teeth 120 transiently rub into the abradable material of the seal pad 118.

Note that in the embodiment depicted, the first and second dampeners 154A, 154B are formed integrally with the seal support extension 152 and base extension, respectively.

It will be appreciated, however, that in other exemplary embodiments, the first and second dampeners 154A, 154B may be removably coupled to the seal support extension 152 and base extension, respectively, using, e.g., a rotational fastener. Additionally, or alternatively, still they may be coupled using a press fit, a weld, a braze, or a combination thereof. In such a case, a material forming the first and second dampeners 154A, 154B may be the same as the material forming the seal support extension 152 and base extension, respectively, or may be different.

The configuration of FIGS. 10 and 11 may therefore prevent or reduce an amplitude of oscillations of the seal support extension 152 relative to the base extension 156 more than a predetermined amount. Further, when the first dampener 154A, the second dampener 154B, or both are contacting one or more of the seal support extension 152, the base extension 156, or the other of the first and second dampeners 154A, 154B, such a configuration may vary a resonance frequency of the seal tooth assembly 150, effectively reducing a susceptibility of the frequency of the seal tooth assembly 150, matching or being in close proximity to the cavity acoustic frequency, leading to undesired oscillations.

Further, as the first dampener 154A, the second dampener 154B, or both contact the seal support extension 152, the base extension 156, and/or the other of the first dampener 154A or the second dampener 154B, such contact creates a friction between the components, which further dampens oscillations of the seal support extension 152 relative to the base extension 156.

Referring still to FIGS. 10 and 11, it will be appreciated that the seal support extension 152 and the base extension 156 are formed integrally with one another, as a monolithic component, such that there is little or no risk of air leakage between the components. Further, for the embodiment depicted, the seal tooth assembly 150 is formed integrally with a rotor arm of the HP spool 34 (and more particularly, a forward spool member 110 of the HP spool 34), as a monolithic component, further reducing the risk of air leakage between the components. For example, in at least certain exemplary embodiments, the integrally formed components may be formed integrally through an additive manufacturing process.

However, in other exemplary embodiments, a seal tooth assembly 150 may be provided in accordance with any other suitable configuration. For example, referring now to FIG. 12, a close-up, schematic view is provided of a seal tooth assembly 150 in accordance with another exemplary aspect of the present disclosure. The exemplary seal tooth assembly 150 of FIG. 12 may be configured in a similar manner as the exemplary seal tooth assembly 150 described above with reference to FIG. 10, and the same or similar numbers may refer to the same or similar parts.

For example, the exemplary seal tooth assembly 150 depicted generally includes a seal support extension 152, a seal tooth 120 extending from the seal support extension 152 towards a seal pad 118 (see, e.g., FIG. 9), and a dampener 154 operable with the seal support extension 152 to dampen movement along the radial direction R and axial direction A.

Figure 12:
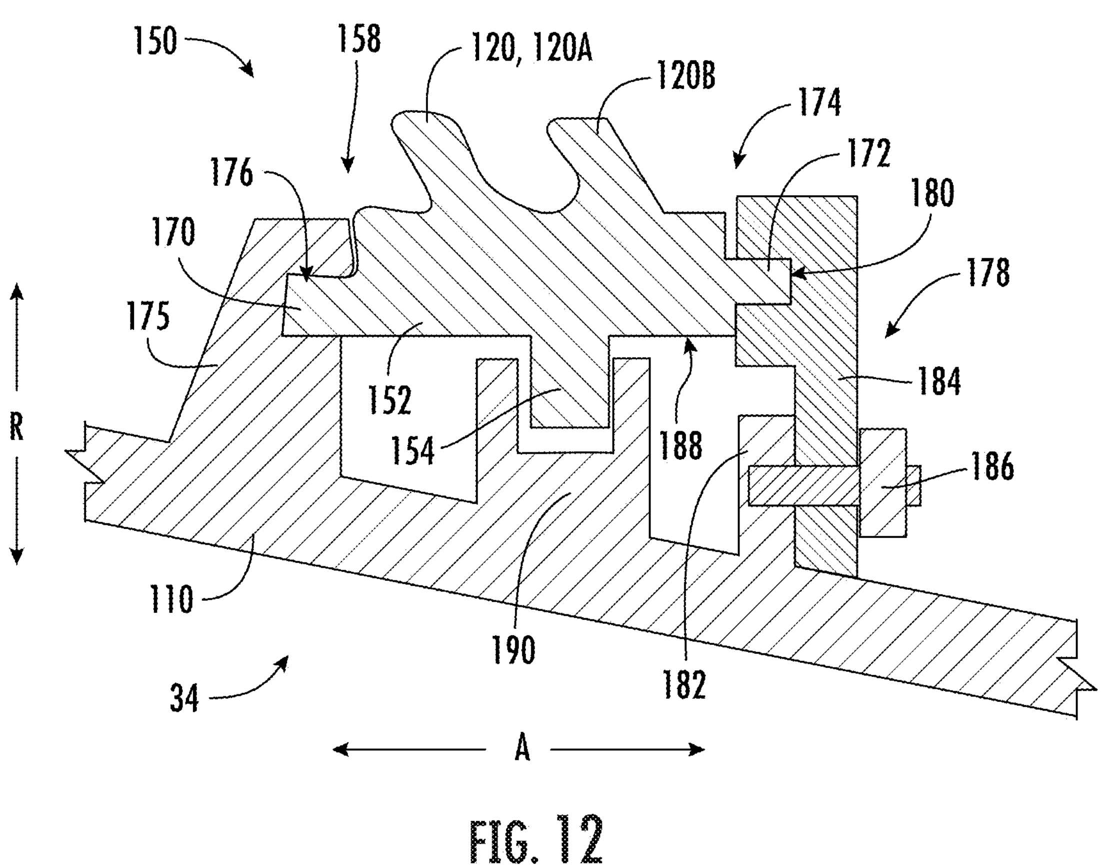
FIG. 12 is a close-up, schematic view of a seal tooth assembly in accordance with another exemplary aspect of the present disclosure.

However, as will be appreciated, for the embodiment of FIG. 12, the seal tooth assembly 150 is formed separately from a rotor arm of an HP spool 34 (or rather, a forward spool member 110 of the HP spool 34 in the embodiment shown) and coupled to the rotor arm of the HP spool 34. More specifically, the seal support extension 152 includes a first flange 170 at a forward end 158 and a second flange 172 at an aft end 174. The rotor arm includes a first bracket 175 defining a first gap 176 within which the first flange 170 is positioned. The first bracket 175 may be formed integrally with the rotor arm. The rotor arm further includes a second bracket 178 defining a second gap 180 within which the second flange 172 is positioned. The second bracket 178 is configured as a two-piece bracket having a first member 182 formed integrally with the rotor arm, and a second member 184 coupled to the first member 182 with a mechanical fastener 186. The second gap 180 is defined by the second member 184. Notably, since the exemplary seal tooth assembly 150 of FIG. 12 is modular, the flanges 170, 172 may be able to move within the first and second gaps 176, 180, respectively. This movement with create frictional resistance at the interfaces.

Further, for the embodiment of FIG. 12, the dampener 154 is configured as a seal ring positioned on an inner side 188 of the seal support extension 152 along the radial direction R. More specifically, the seal ring is configured as a piston ring contacting the inner side 188 of the seal support extension 152 and configured to bias the seal support extension 152 outwardly along the radial direction R.

Figure 13:
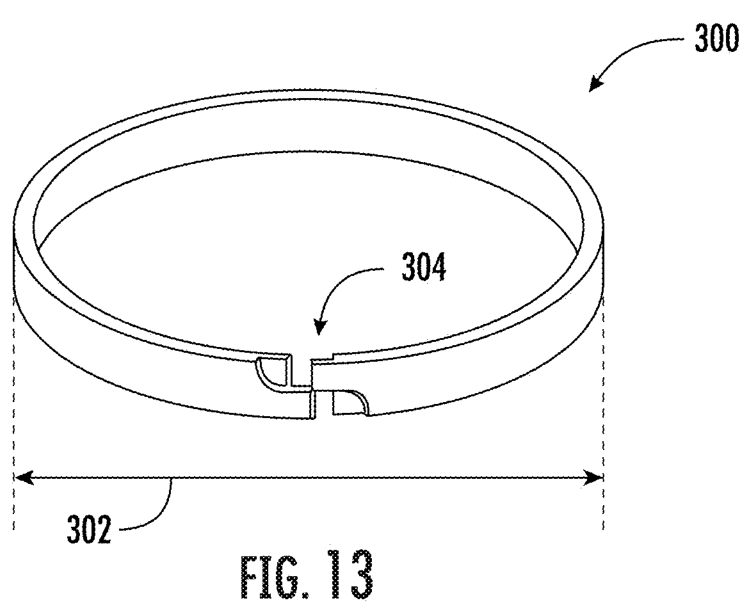
FIG. 13, is a perspective view of a piston ring in accordance with an exemplary aspect of the present disclosure.

The term "seal ring" may refer to any suitable annular/360 degree structure capable of forming a fluid seal with the inner side 188 of the seal support extension 152. The "piston ring" is a 360 degree ring that is elastically deformed for installation, such that it presses the inner side 188 of the seal support extension 152 outward along the radial direction R. For example, referring briefly to FIG. 13, a perspective view is provided of a piston ring 300 in accordance with the present disclosure as may be used as the dampener 154 in FIG. 12. The piston ring 300 is shown in a non-deformed state, wherein the piston ring 300 defines a diameter 302 greater than a diameter of the location into which it will be installed (i.e., a diameter of the inner side 188 of the seal support extension 152 along a radial direction R in the embodiment of FIG. 12). The piston ring 300 further defines an overlap joint 304 that will overlap when elastically deformed into position.

Referring again to FIG. 12, for the embodiment depicted, the rotor arm includes a seal housing 190, with the dampener 154 positioned at least partially within the seal housing 190 and configured to form a fluid seal between the seal housing 190 in the seal support extension 152. In such a manner, the dampener 154 and seal housing 190 may reduce a substantial portion of an airflow leakage through a joint between the first flange 170 and the first gap 176, as well as any residual airflow leakage through a joint between the second flange 172 and the second gap 180. As will be appreciated, the joint between the first flange 170 and the first gap 176 is positioned in a high pressure cavity, whereas the joint between the second flange 172 and the second gap 180 is positioned in a low pressure cavity, as the pressure drop occurs across the seal teeth 120.

Further, as the seal support extension 152 flexes along the radial direction R, such movement may move the dampener 154 inward or outward along the radial direction R, causing a friction between the seal ring and the seal housing 190. The friction generated between the dampener 154 and seal housing 190 may cause a dampening of such movement of the seal support extension 152 along the radial direction R. Further, as the seal support extension 152 flexes along the radial direction R, all of the joints between adjacent parts (e.g., the joint between the first flange 170 and the first gap 176, and the joint between the second flange 172 and the second gap 180) may similarly create friction to provide a dampening of such movement of the seal support extension 152 along the radial direction R.

It will be appreciated, however, that in other exemplary embodiments, any other suitable dampener 154 may be provided that is operable with a seal support extension 152 to dampen movement along the radial direction R.

Figure 14:
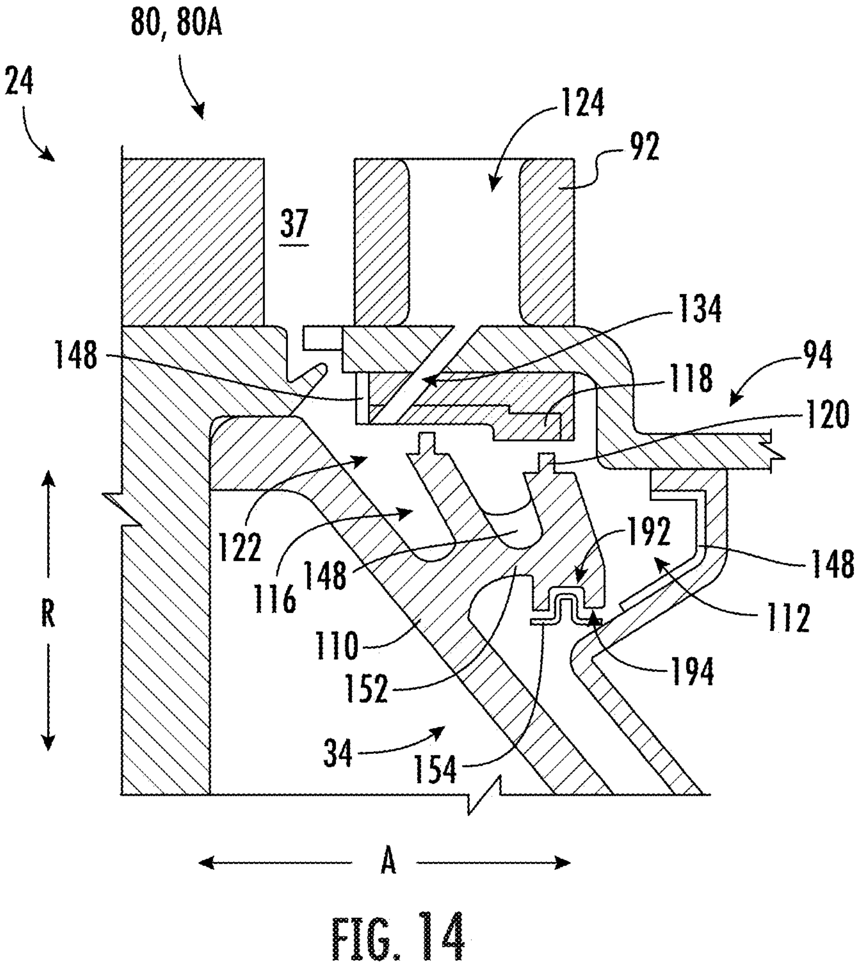
FIG. 14 is a schematic, cross-sectional view of a portion of a compressor section and of a combustion section of a gas turbine engine in accordance with an exemplary aspect of the present disclosure.

For example, referring now to FIG. 14, a close-up, schematic view is provided of a seal tooth assembly 150 in accordance with yet another exemplary aspect of the present disclosure. The exemplary seal tooth assembly 150 of FIG. 14 may be configured in a similar manner as the exemplary seal tooth assembly 150 described above with reference to FIG. 10, and the same or similar numbers may refer to the same or similar parts.

For example, the seal tooth assembly 150 in the embodiment of FIG. 14 generally includes a seal support extension 152 a seal tooth 120 extending from the seal support extension 152 towards a seal pad 118 and a dampener 154 operable with the seal support extension 152 to dampen movement along a radial direction R. In particular, for the embodiment depicted, the seal support extension 152 defines a channel 192 extending along a circumferential direction C on an inner surface 194 of the seal support extension 152 along the radial direction R. The dampener 154, for the embodiment depicted, is a dampening ring positioned at least partially within the channel 192 defined by the seal support extension 152 and extending 360 degrees in the circumferential direction (or at least 300 degrees; see piston ring 300 in FIG. 13). As a rotational speed of an HP spool 34 including the seal tooth assembly 150 increases, centrifugal force may press the dampener 154, or rather the dampening ring, into the channel 192, increasing a stiffness of the seal support extension 152, and varying a resonance frequency of the seal support extension 152. In such a manner, the dampening ring may be configured to dampen movement along the radial direction R.

Further aspects are provided by the subject matter of the following clauses:

A gas turbine engine defining a radial direction, the gas turbine engine comprising: a compressor section comprising a compressor, a combustion section, and a turbine section arranged in serial flow order and defining a working gas flowpath, the compressor comprising an aft-most compressor stage; a spool drivingly coupled to the compressor; a stage of stator vanes located downstream of the aft-most compressor stage; and a stator case coupled to the stage of stator vanes inward of the stage of stator vanes along the radial direction, the spool and the stator case together defining a rotor cavity in fluid communication with the working gas flowpath, the stage of stator vanes including a first stator vane defining a fluid passage, and the stator case defining a plenum and a supplemental airflow passage, the plenum in fluid communication with the fluid passage in the first stator vane, the supplemental airflow passage in fluid communication with the plenum and the rotor cavity for providing an airflow to the rotor cavity.

The gas turbine engine of any preceding clause, wherein the gas turbine engine defines a circumferential direction, and wherein the plenum extends in the circumferential direction.

The gas turbine engine of any preceding clause, wherein the gas turbine engine defines a circumferential direction, wherein the supplemental airflow passage is a first supplemental airflow passage of an array of supplemental airflow passages defined by the stator case, the array of supplemental airflow passages arranged along the circumferential direction.

The gas turbine engine of any preceding clause, wherein the gas turbine engine defines an axial direction and a reference plane extending in the axial direction and radial direction, wherein the supplemental airflow passage passes through the reference plane and includes an airflow outlet defining an airflow outlet direction, the airflow outlet direction defining a swirl angle greater than 0 degrees with the reference plane.

The gas turbine engine of any preceding clause, wherein the swirl angle is greater than 0 degrees and less than 85 degrees.

The gas turbine engine of any preceding clause, wherein the fluid passage of the first stator vane is in fluid communication with the compressor.

The gas turbine engine of any preceding clause, wherein the compressor is a high pressure compressor, and wherein the stage of stator vanes is a stage of discharge nozzles fluidly connecting the high pressure compressor to the combustion section, and wherein the fluid passage of the first stator vane is in fluid communication with the high pressure compressor, is in direct fluid communication with the working gas flowpath through the stage of discharge nozzles, or both.

The gas turbine engine of any preceding clause, further comprising: a heat exchanger in fluid communication with the fluid passage of the first stator vane at a location downstream of the compressor section.

The gas turbine engine of any preceding clause, wherein the first stator vane defines an opening at a location within the working gas flowpath for receiving a working gas flowpath airflow from the working gas flowpath, wherein the fluid passage is in fluid communication with the opening.

The gas turbine engine of any preceding clause, wherein the stator casing and rotor disk together form a compressor discharge pressure seal and together define a rotor cavity opening, and wherein the rotor cavity extends between the compressor discharge pressure seal and the rotor cavity opening.

A gas turbine engine defining an axial direction, a radial direction, and a reference plane extending in the axial direction and the radial direction: a compressor section comprising a compressor, a combustion section, and a turbine section arranged in serial flow order and defining a working gas flowpath, the compressor comprising an aft-most compressor stage; a spool drivingly coupled to the compressor; a stage of stator vanes located downstream of the aft-most compressor stage; and a stator case coupled to the stage of stator vanes inward of the stage of stator vanes along the radial direction, the spool and the stator case together defining a rotor cavity in fluid communication with the working gas flowpath, the stage of stator vanes including a first stator vane defining a fluid passage, and the stator case defining a supplemental airflow passage, the supplemental airflow passage in fluid communication with the fluid passage and the rotor cavity, the supplemental airflow passage passing through the reference plane and defining an airflow outlet direction, the airflow outlet direction defining a swirl angle greater than 0 degrees with the reference plane.

A gas turbine engine defining an axial direction and a radial direction, the gas turbine engine comprising: a compressor section comprising a compressor, a combustion section, and a turbine section arranged in serial flow order and defining a working gas flowpath, the compressor comprising an aft-most compressor stage and defining a compressor exit temperature, $T_3$, in degrees Rankine during an operating condition of the gas turbine engine; a spool drivingly coupled to the compressor; a stage of stator vanes located downstream of the aft-most compressor stage; and a stator case coupled to the stage of stator vanes inward of the stage of stator vanes along the radial direction, the spool and the stator case together defining a rotor cavity in fluid communication with the working gas flowpath, wherein the stage of stator vanes defines one or more fluid passages and the stator case defines a plurality of supplemental airflow passages, the plurality of supplemental airflow passages in fluid communication with the one or more fluid passages and the rotor cavity, wherein the plurality of supplemental airflow passages are configured to provide a supplemental airflow to the rotor cavity at a passage temperature, $T_P$, in degrees Rankine during the operating condition of the gas turbine engine, wherein each supplemental airflow passage of the plurality of supplemental airflow passages defines a swirl angle, $\theta_{Swirl}$, with a local reference plane, each local reference plane passing through a respective supplemental airflow passage of the plurality of supplemental airflow passages and extending in the axial and radial directions, wherein the gas turbine engine defines a supplemental airflow temperature ratio (SATR) equal to a ratio of $T_P$ to $T_3$, and wherein SATR is less than 1.0 and $\theta_{Swirl}$ is greater than or equal to 0 degrees and less than or equal to 85 degrees, or wherein SATR is greater than or equal to 1.0 and $\theta_{Swirl}$ is greater than 0 degrees and less than or equal to 85 degrees.

The gas turbine engine of any preceding clause, wherein the spool and stator case together define a rotor cavity opening, wherein the rotor cavity opening defines a cross-sectional area, $A_{FO}$, wherein the plurality of supplemental airflow passages define a total cross-sectional area, $A_{SAP\_Total}$, and wherein a ratio of $A_{FO}$ to $A_{SAP\_Total}$ is greater than or equal to 0.05 and less than 0.25.

The gas turbine engine of any preceding clause, wherein SATR is greater than or equal to 0.8 and less than or equal to 1.15.

The gas turbine engine of any preceding clause, wherein a relationship between $\theta_{Swirl}$ and SATR is as follows: $\theta_{Swirl} \geq 199 \times SATR^2 - 186 \times SATR + 7$.

The gas turbine engine of any preceding clause, wherein the stator case defines a plenum, and wherein the plurality of supplemental airflow passages are in fluid communication with the one or more fluid passages through the plenum.

The gas turbine engine of any preceding clause, wherein the gas turbine engine defines a circumferential direction, and wherein the plenum extends in the circumferential direction.

The gas turbine engine of any preceding clause, wherein the one or more fluid passages are in fluid communication with the compressor.

The gas turbine engine of any preceding clause, further comprising: a heat exchanger in fluid communication with the one or more fluid passages at a location downstream of the compressor, and wherein SATR is less than 1.

The gas turbine engine of any preceding clause, wherein the compressor is a high pressure compressor, and wherein the stage of stator vanes is a stage of discharge nozzles fluidly connecting the high pressure compressor to the combustion section.

A gas turbine engine defining a radial direction, a circumferential direction, and an axial direction, the gas turbine engine comprising: a compressor section comprising a compressor, a combustion section, and a turbine section arranged in serial flow order and defining a working gas flowpath, the compressor comprising an aft-most compressor stage; a stage of stator vanes located downstream of the aft-most compressor stage; a stator case coupled to the stage of stator vanes inward of the stage of stator vanes along the radial direction, the stator case including a seal pad; and a spool drivingly coupled to the compressor, the spool and the stator case together defining a rotor cavity in fluid communication with the working gas flowpath, the spool comprising a seal tooth assembly, the seal tooth assembly including a seal support extension, a seal tooth extending from the seal support extension toward the seal pad, and a dampener operable with the seal support extension The gas turbine engine of any preceding clause, wherein the dampener is operable to dampen movement of the seal support extension along the radial direction, the circumferential direction, the axial direction, or a combination thereof.

The gas turbine engine of any preceding clause, wherein the seal tooth assembly comprises a base extension extending substantially parallel to the seal support extension, and wherein the dampener is positioned between the base extension and the seal support extension.

The gas turbine engine of any preceding clause, wherein the seal tooth assembly comprises a base extension extending parallel to the seal support extension, and wherein the dampener is positioned between the base extension and the seal support extension.

The gas turbine engine of any preceding clause, wherein the seal support extension is cantilevered from the base extension.

The gas turbine engine of any preceding clause, wherein the seal support extension and the base extension define a gap having a gap height along the radial direction, wherein the dampener defines a dampener height along the radial direction that is less than the gap height.

The gas turbine engine of any preceding clause, wherein the dampener is a first dampener coupled to and extending from the seal support extension, and wherein the seal tooth assembly further comprises a second dampener coupled to and extending from the base extension.

The gas turbine engine of any preceding clause, wherein the first dampener defines a first lip, wherein the second dampener defines a second lip, and wherein the first lip and second lip are overlapping along the radial direction.

The gas turbine engine of any preceding clause, wherein the seal support extension and the base extension are formed integrally.

The gas turbine engine of any preceding clause, wherein the spool further comprises a rotor arm extending at least partially along the radial direction, and wherein the seal tooth assembly is formed integrally with the rotor arm.

The gas turbine engine of any preceding clause, wherein the spool further comprises a rotor arm extending at least partially along the radial direction, and wherein the seal tooth assembly is formed separately from the rotor arm and coupled to the rotor arm.

The gas turbine engine of any preceding clause, wherein the dampener is configured as a seal ring positioned on an inner side of the seal support extension along the radial direction.

The gas turbine engine of any preceding clause, wherein the seal ring is a piston ring configured to bias the seal support extension outwardly along the radial direction.

The gas turbine engine of any preceding clause, wherein the rotor arm comprises a housing, and wherein the seal ring is positioned at least partially within the housing to form a fluid seal between the housing and the seal support extension.

The gas turbine engine of any preceding clause, wherein the rotor cavity is in fluid communication with a portion of the working gas flowpath, wherein the seal tooth assembly and the seal pad form a fluid seal of the rotor cavity.

A seal tooth assembly for a spool of a gas turbine engine, the gas turbine engine comprising a stator case having a seal pad, the seal tooth assembly comprising: a seal support extension; a seal tooth extending from the seal support extension and further extending toward the seal pad of the stator case when the seal tooth assembly is installed in the gas turbine engine; and a dampener operable with the seal support extension operable to dampen movement.

The seal tooth assembly of any preceding clause, wherein the dampener is operable to dampen movement of the seal support extension along the radial direction, the circumferential direction, the axial direction, or a combination thereof.

The seal tooth assembly of any preceding clause, further comprising: a base extension extending substantially parallel to the seal support extension, wherein the dampener is positioned between the base extension and the seal support extension.

The seal tooth assembly of any preceding clause, further comprising: a base extension extending parallel to the seal support extension, wherein the dampener is positioned between the base extension and the seal support extension.

The seal tooth assembly of any preceding clause, wherein the seal support extension is cantilevered from the base extension.

The seal tooth assembly of any preceding clause, wherein the seal support extension and the base extension define a gap having a gap height along the radial direction, wherein the dampener defines a dampener height along the radial direction that is less than the gap height.

The seal tooth assembly of any preceding clause, wherein the dampener is a first dampener coupled to and extending from the seal support extension, and wherein the seal tooth assembly further comprises a second dampener coupled to and extending from the base extension.

The seal tooth assembly of any preceding clause, wherein the first dampener defines a first lip, wherein the second dampener defines a second lip, and wherein the first lip and second lip are overlapping along the radial direction.

The seal tooth assembly of any preceding clause, wherein the dampener is configured as a seal ring positioned on an inner side of the seal support extension along the radial direction.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A gas turbine engine defining a longitudinal centerline, a radial direction perpendicular to the longitudinal centerline, a circumferential direction around the longitudinal centerline, and an axial direction in line with the longitudinal centerline, the gas turbine engine comprising:

a compressor section comprising a compressor, a combustion section, and a turbine section arranged in serial flow order and defining a working gas flowpath, the compressor comprising an aft-most compressor stage;

a stage of stator vanes located downstream of the aft-most compressor stage;

a stator case coupled to the stage of stator vanes inward of the stage of stator vanes along the radial direction, the stator case including a seal pad; and a spool drivingly coupled to the compressor, the spool and the stator case together defining a rotor cavity in fluid communication with the working gas flowpath, the spool comprising a seal tooth assembly, the seal tooth assembly comprising:

a seal support extension;

a seal tooth extending from the seal support extension toward the seal pad; and a dampener coupled to and extending from the seal support extension, wherein the spool further comprises a rotor arm extending at least partially along the radial direction, and wherein the seal tooth assembly is formed separately from the rotor arm and coupled to the rotor arm;

wherein the seal support extension includes a first flange and a second flange, wherein the rotor arm includes a first bracket defining a first gap and a second bracket defining a second gap, and wherein the first flange is positioned in the first gap and the second flange is positioned within the second gap.

2. The gas turbine engine of claim 1, wherein the dampener is configured as a seal ring positioned on an inner side of the seal support extension along the radial direction.

3. The gas turbine engine of claim 2, wherein the seal ring is a piston ring configured to bias the seal support extension outwardly along the radial direction.

4. The gas turbine engine of claim 3, wherein the piston ring defines an overlap joint configured to overlap when elastically deformed.

5. The gas turbine engine of claim 2, wherein the rotor arm comprises a housing, and wherein the seal ring is positioned at least partially within the housing to form a fluid seal between the housing and the seal support extension.

6. The gas turbine engine of claim 1, wherein the second bracket is a two-piece construction including a first member formed integrally with the rotor arm and a second member coupled to the first member with a mechanical fastener.

7. The gas turbine engine of claim 6, wherein the second gap is defined by the second member.

8. The gas turbine engine of claim 6, wherein the second member is positioned at least partially outward of the first member in the radial direction.

9. The gas turbine engine of claim 1, wherein the rotor arm is part of the spool which is a high pressure spool.

10. A gas turbine engine defining a longitudinal centerline, a radial direction perpendicular to the longitudinal centerline, a circumferential direction around the longitudinal centerline, and an axial direction in line with the longitudinal centerline, the gas turbine engine comprising:

a compressor section comprising a compressor, a combustion section, and a turbine section arranged in serial flow order and defining a working gas flowpath, the compressor comprising an aft-most compressor stage;

a stage of stator vanes located downstream of the aft-most compressor stage;

a stator case coupled to the stage of stator vanes inward of the stage of stator vanes along the radial direction, the stator case including a seal pad; and a spool drivingly coupled to the compressor, the spool and the stator case together defining a rotor cavity in fluid communication with the working gas flowpath, the spool comprising a seal tooth assembly, the seal tooth assembly comprising:

a seal support extension;

a seal tooth extending from the seal support extension toward the seal pad; and a dampener coupled to and extending from the seal support extension, wherein the spool further comprises a rotor arm extending at least partially along the radial direction, and wherein the seal tooth assembly is formed separately from the rotor arm and coupled to the rotor arm;

wherein the dampener is configured as a seal ring positioned on an inner side of the seal support extension along the radial direction;

wherein the rotor arm comprises a housing, and wherein the seal ring is positioned at least partially within the housing to form a fluid seal between the housing and the seal support extension.

* * * * *